US008944797B2

(12) United States Patent
Misonoo et al.

(10) Patent No.: US 8,944,797 B2
(45) Date of Patent: Feb. 3, 2015

(54) MOLDING APPARATUS AND METHOD FOR MANUFACTURING INSERT MOLDED ARTICLE

(75) Inventors: Kazutoshi Misonoo, Kanagawa (JP); Makoto Fuchigami, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 525 days.

(21) Appl. No.: 13/214,750

(22) Filed: Aug. 22, 2011

(65) Prior Publication Data

US 2012/0242001 A1 Sep. 27, 2012

(30) Foreign Application Priority Data

Mar. 25, 2011 (JP) ................................ 2011-068765

(51) Int. Cl.
*B29C 39/10* (2006.01)
*B29C 33/12* (2006.01)
*G03G 15/20* (2006.01)

(52) U.S. Cl.
CPC .................................... *G03G 15/206* (2013.01)
USPC ............ 425/117; 425/110; 425/112; 264/279

(58) Field of Classification Search
USPC ......................................... 425/110, 112, 117
See application file for complete search history.

(56) References Cited

U.S. PATENT DOCUMENTS

2012/0243920 A1* 9/2012 Fuchigami et al. ........... 399/329
2012/0243921 A1* 9/2012 Fuchigami et al. ........... 399/329

FOREIGN PATENT DOCUMENTS

| | | |
|---|---|---|
| JP | A-04-328838 | 11/1992 |
| JP | A-06-149104 | 5/1994 |
| JP | A-09-292786 | 11/1997 |
| JP | A-2006-133294 | 5/2006 |
| JP | A-2008-064924 | 3/2008 |

OTHER PUBLICATIONS

U.S. Appl. No. 13/193,261 (Related Application), filed Jul. 28, 2011.

* cited by examiner

*Primary Examiner* — Ryan Ochylski
(74) *Attorney, Agent, or Firm* — Oliff PLC

(57) ABSTRACT

A molding apparatus includes a mold having a long cavity; a pinching member that holds a long metal plate having a pair of longitudinal ends, a pair of lateral ends and a pair of surfaces forming a plate shape by pinching the long metal member, the long metal plate being inserted into the cavity such that the longitudinal direction of the long metal plate is directed to a longitudinal direction of the cavity and the long metal plate is positioned at a position offset from a center of the cross-section of the circumferential surface; and an inlet for pouring a resin material into a space defined between the mold and the pinching member, wherein a shape of the space is such that the amounts of the resin material to be poured around the each side of the pair of surfaces of the long metal plate are equivalent.

5 Claims, 21 Drawing Sheets

MOLDING APPARATUS AND METHOD FOR MANUFACTURING INSERT MOLDED ARTICLE

CROSS-REFERENCE TO RELATED APPLICATIONS

This application is based on and claims priority under 35 USC 119 from Japanese Patent Application No. 2011-068765 filed Mar. 25, 2011.

BACKGROUND

Technical Field

The present invention relates to a molding apparatus and a method for manufacturing an insert molded article.

SUMMARY

According to an aspect of the invention, there is provided a molding apparatus for manufacturing an insert mold article having a circumferential surface in a longitudinal direction of the insert mold article, including a mold having a long cavity; a pinching member that holds a long metal plate having a pair of longitudinal ends, a pair of lateral ends and a pair of surfaces forming a plate shape by pinching the long metal member, the long metal plate being inserted into the cavity such that the longitudinal direction of the long metal plate is directed to a longitudinal direction of the cavity and the long metal plate is positioned at a position offset from a center of the cross-section of the circumferential surface; and an inlet for pouring a resin material into a space defined between the mold and the pinching member, the space is prepared at least around both sides of the pair of surfaces of the long metal plate, wherein a shape of the space defined with the mold and the pinching member is such that the amounts of the resin material to be poured around the each side of the pair of surfaces of the long metal plate are equivalent.

BRIEF DESCRIPTION OF THE DRAWINGS

Exemplary embodiments of the present invention will be described in detail based on the following figures, wherein.

DETAILED DESCRIPTION

Hereinafter, an exemplary embodiment of a fixing device related to the invention, an image forming apparatus, a molding apparatus for manufacturing a pressing member of the fixing device, and a method for manufacturing the pressing member that is an insert molded article will be described with reference to the attached drawings.

(Overall Configuration)

Figure 1:
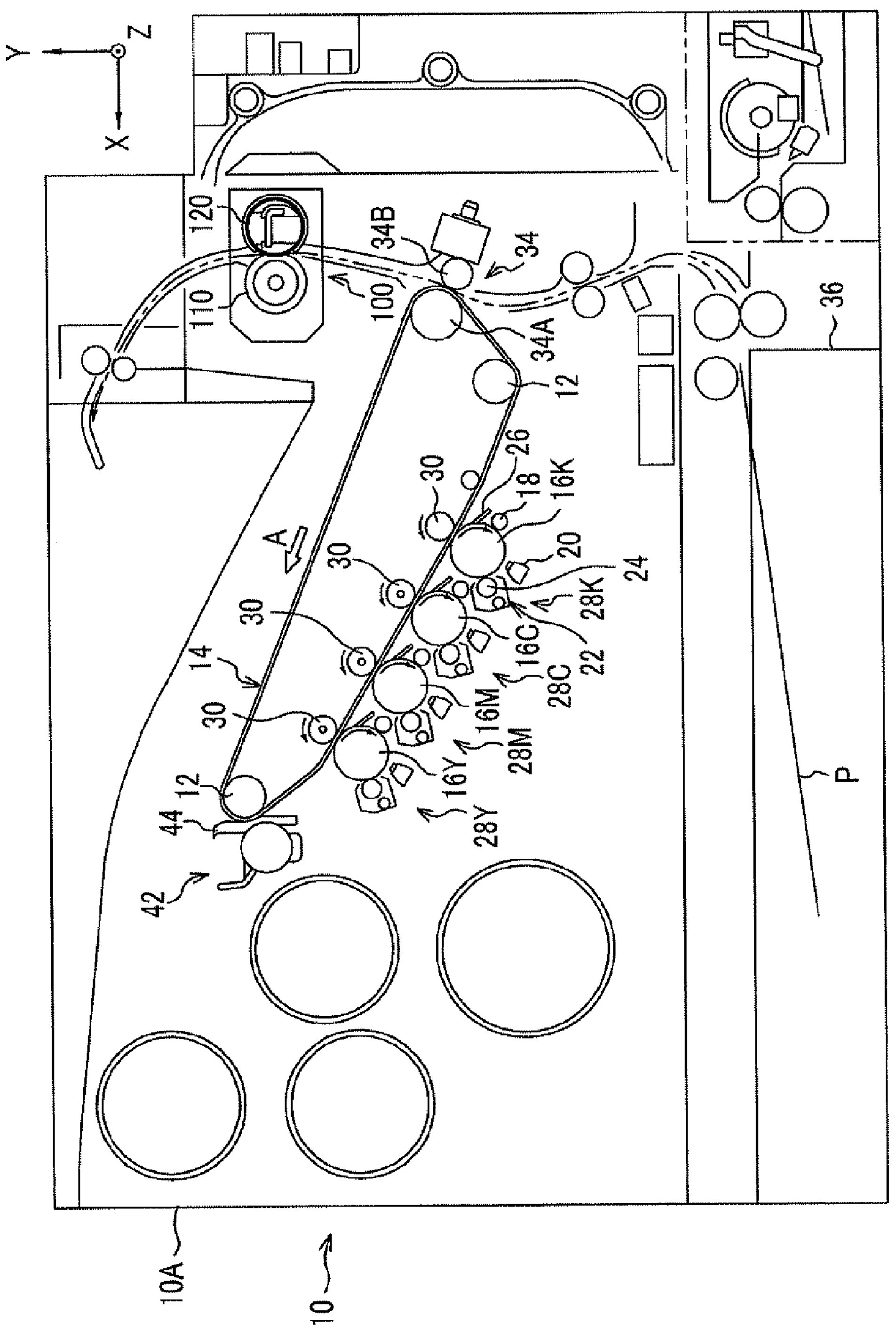
FIG. 1 is an overall configuration view showing the configuration of an image forming apparatus related to an exemplary embodiment of the invention.

FIG. 1 shows an example of the configuration of an image forming apparatus that has the fixing device related to the exemplary embodiment of the invention. The up-and-down direction of an apparatus body 10A of the image forming apparatus 10 is described as the direction of an arrow Y, the right-and-left direction is described as the direction of an arrow X, and the depth direction is described as the direction of an arrow Z.

As shown in FIG. 1, an apparatus body 10A of the image forming apparatus 10 is provided with an intermediate transfer body belt 14 serving as an example of an endless belt-shaped body to be transferred, which is stretched over plural rollers 12 and conveyed in the direction of an arrow A by the driving of a motor (not shown).

The image forming apparatus 10 supports formation of a color image, and has image forming units 28Y, 28M, 28C, and 28K that form toner images corresponding to four colors of yellow (Y), magenta (M), cyan (C), and black (K). The image forming units 28Y, 28M, 28C, and 28K are arranged along the conveying direction of the intermediate transfer body belt 14, and are detachably supported by the apparatus body 10A.

In addition, members provided for the respective colors are designated by adding letters (Y/M/C/K) indicating the colors to the ends of reference numerals, respectively. Particularly when description is made without distinguishing the colors, the letters at the ends of the reference numerals are omitted.

The image forming units 28Y, 28M, 28C, and 28K respectively include photoreceptor drums 16Y, 16M, 16C, and 16K serving as examples of image carriers that are rotated in the clockwise direction by a driving unit composed of a motor and gears that are not shown.

A charging roller 18 for uniformly charging the surface of the photoreceptor drum 16 with given potential is arranged at the peripheral surface of each photoreceptor drum 16. The charging roller 18 is a conductive roller, and the peripheral surface thereof comes into contact with the peripheral surface of the photoreceptor drum 16. The charging roller 18 is arranged such that the axis direction of the charging roller 18 and the axis direction of the photoreceptor drum 16 become parallel to each other.

An LED print head (hereinafter referred to as "LPH") 20 serving as an example of an exposure device is arranged at the peripheral surface of each photoreceptor drum 16 on the downstream side of the charging roller 18 in the rotational direction of the photoreceptor drum. LPH 20 is long, and is arranged along the axial direction of a light emitting drum 16. LPH 20 has an LED (light emitting diode) array as a light source. LPH 20 irradiates the photoreceptor drum 16 with light beams according to image data, thereby forming an electrostatic latent image on the surface of the photoreceptor drum 16.

A developing device 22 is arranged at the peripheral surface of each photoreceptor drum 16 on the downstream side of LPH 20 in the rotational direction of the photoreceptor drum. The developing device 22 is provided to develop an electrostatic latent image formed on the surface of the photoreceptor drum 16 with a toner for each color (yellow/magenta/cyan/black) so as to form a toner image.

Specifically, the developing device 22 has a cylindrical developing roller 24 that is arranged in close proximity to the photoreceptor drum 16, and is rotatably provided. A development bias is applied to the developing roller 24, and a toner loaded into the developing device 22 is adhered to the peripheral surface of the developing roller. By the rotation of the developing roller 24, the toner adhered to the developing roller 24 is conveyed to the surface of the photoreceptor drum 16, the toner is rubbed against the photoreceptor drum 16, and the electrostatic latent image formed on the surface of the photoreceptor drum 16 is developed as a toner image.

A transfer roller 30 serving as an example of a transfer device that transfers the toner image on each photoreceptor drum 16 to the intermediate transfer body belt 14 is provided at the peripheral surface of each photoreceptor drum 16 on the downstream side of the developing device 22 in the rotational direction of the photoreceptor drum. The transfer roller 30 is charged with a given potential and rotated counterclockwise to convey the intermediate transfer body belt 14 at a given speed and press the intermediate transfer body belt 14 against the photoreceptor drum 16. Thereby, the toner image on the surface of the photoreceptor drum 16 is transferred onto the intermediate transfer body belt 14.

A cleaning blade 26 is arranged on the peripheral surface of each photoreceptor drum 16 on the downstream side of the transfer roller 30. The cleaning blade 26 is disposed such that one end thereof comes into contact with the surface of the photoreceptor drum 16, and scrapes off and recovers the toner remaining on the photoreceptor drum 16 without being transferred to the intermediate transfer body belt 14, and other color toners that have adhered onto the photoreceptor drum 16 at the time of transfer.

The respective toner images formed by the respective image forming units 28 are transferred so as to overlap each other on the belt surface of the intermediate transfer body belt 14. Thereby, a color toner image is formed on the intermediate transfer body belt 14. Hereinafter, a toner image to which four color toner images are transferred in an overlapping manner is referred to as a "final toner image".

A secondary transfer device 34 configured to include two facing rollers 34A and 34B is disposed on the downstream side of the four photoreceptor drums 16 in the conveying direction of the intermediate transfer body belt 14. In the secondary transfer device 34, the final toner image formed on the intermediate transfer body belt 14 is transferred to the recording paper P that has been taken out from a paper tray 36 provided at the bottom of the image forming apparatus 10 and has been conveyed to between the rollers 34A and 34B.

A fixing device 100 is provided on the conveying path of the recording paper P in which the final toner image has been transferred. The fixing device 100 is configured to include a heating roller 110 and a pressurizing roller 120, and the recording paper P conveyed to the fixing device 100 is pinched and conveyed by the heating roller 110 and the pressurizing roller 120. Thereby, the toner on the recording paper P is melted, is brought into pressure contact with the recording paper P, and is fixed on the recording paper P.

On the other hand, in the outer peripheral surface of the intermediate transfer body belt 14, a cleaning device 42 that recovers the toner remaining on the intermediate transfer body belt 14 without being transferred to the recording paper P by the secondary transfer device 34 is disposed on the downstream side of the secondary transfer device 34 in the conveying direction of the intermediate transfer body belt 14. The cleaning device 42 has a blade 44 that comes into contact with the intermediate transfer body belt 14, and rubs off the toner remaining on the intermediate transfer body belt 14 to recover the toner.

In the image forming apparatus 10 configured as above, an image is formed as follows.

First, the surface of the photoreceptor drum 16 is uniformly negatively-charged by the charging roller 18. Next, exposure is performed on the surface of the charged photoreceptor drum 16, on the basis of the image data to be printed by LPH 20, and an electrostatic latent image is formed on the surface of the photoreceptor drum 16.

Next, when the electrostatic latent image on the surface of the photoreceptor drum 16 passes by the developing roller of the developing device 22, a toner adheres to the electrostatic latent image due to an electrostatic force, whereby the electrostatic latent image is visualized as a toner image.

Next, respective visualized color toner images are sequentially transferred to the intermediate transfer body belt 14 by the transfer rollers 30, and a final toner image is formed in color on the intermediate transfer body belt 14.

Next, the final toner image on the intermediate transfer body belt 14 is sent to between the rollers 34A and 34B of the secondary transfer device 34, and the final toner image is transferred to the recording paper P that is taken out from the paper tray 36, and conveyed to between the rollers 34A and 34B.

Next, the toner image transferred to the recording paper P is fixed as a permanent image by the fixing device 100. The recording paper P that has passed through the fixing device 100 is ejected to the outside of the apparatus.

(Configuration of Fixing Device 100)

Next, the fixing device 100 will be described in detail.

Figure 2:
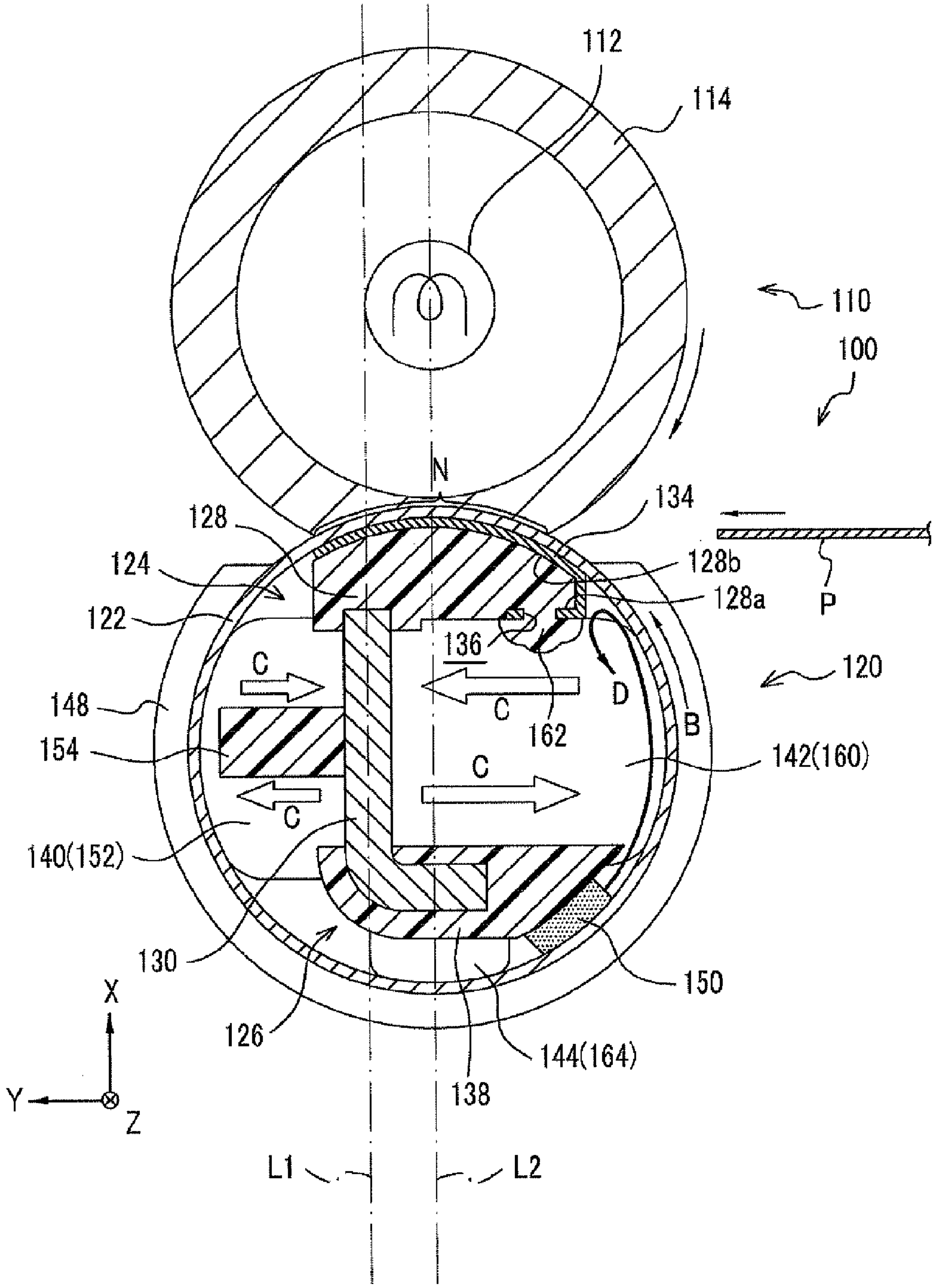
FIG. 2 is a cross-sectional view showing the configuration of a fixing device related to the exemplary embodiment of the invention.

As shown in FIG. 2, the fixing device 100 includes the heating roller 110 and the pressurizing roller 120 serving as an example of rollers. The heating roller 110 has a halogen lamp 112 serving as an example of a heat source at a central portion thereof. The halogen lamp 112 has a long shape, and is arranged such that the longitudinal direction thereof is directed to the direction of the arrow Z. A roller portion 114 of the heating roller 110 is heated by the heat radiated from the halogen lamp 112. The roller portion 114 has a configuration in which the roller portion is rotationally driven by a driving source (not shown), such as a motor. That is, the heating roller 110 is constituted as a rotatable driving roller that has a heat source.

The pressurizing roller 120 includes an endless belt 122 that rotationally moves so as to follow the rotation of the roller portion 114 of the heating roller 110 (with the rotation of the roller portion 114), and a pressing member 124 that is arranged inside the endless belt 122 to guide the rotational movement of the endless belt 122 and press the endless belt 122 against the heating roller 110.

The pressing member 124 is biased toward the heating roller 110 in the direction of arrow X by biasing members (not shown), such as springs provided at both ends thereof in the direction of the arrow Z, and presses the endless belt 122 against the heating roller 110 by the biasing force thereof. As the endless belt 122 is pushed against the heating roller 110 by the pressing member 124, a nip portion N for fixing a toner onto the recording paper P is formed between the endless belt 122 and the heating roller 110, while pinching and conveying the recording paper P. In addition, the heat of the heating roller 110 is transmitted to the endless belt 122 via the nip portion N.

The pressing member 124 has a guide portion 126 which guides the rotational movement of the endless belt 122, a pressing portion 128 that presses the endless belt 122 against the heating roller 110, and a metal plate 130, serving as an example of a plate made of, for example, a steel material, for holding the guide portion 126 and the pressing portion 128.

Figure 3:
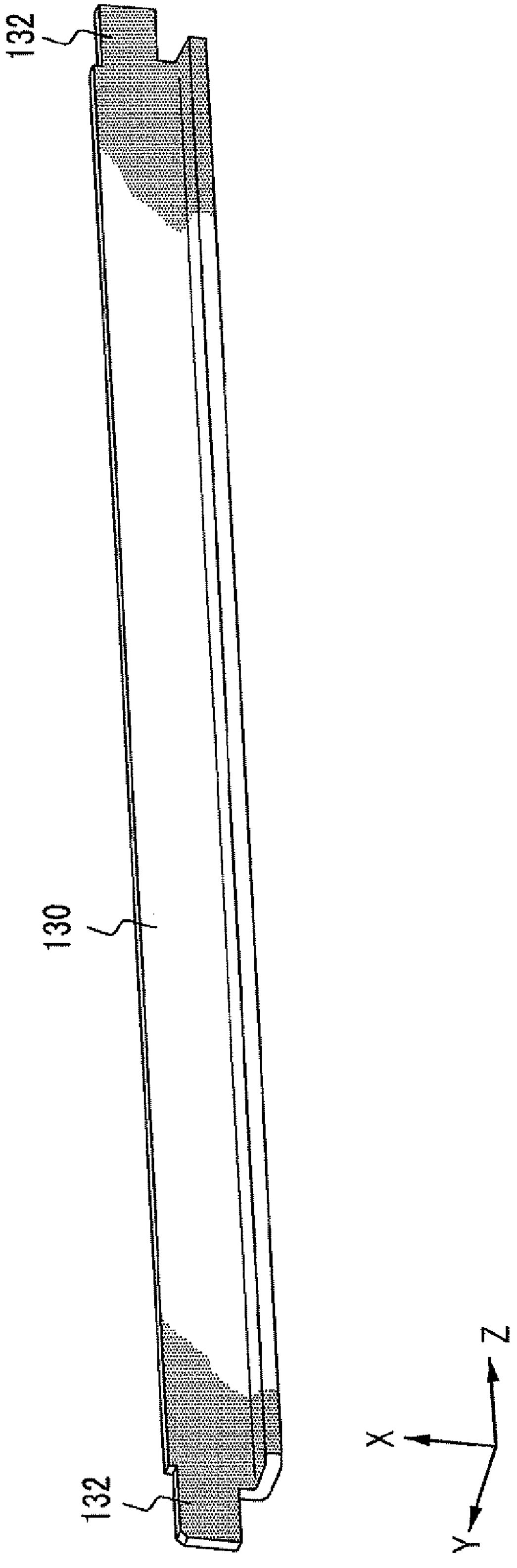
FIG. 3 is a perspective view showing a metal plate of a pressing member of the fixing device related to the exemplary embodiment of the invention.

As shown in FIG. 3, the metal plate 130 has a long shape that is longitudinal in the direction of the arrow Z, is bent at a right angle on one side in the lateral direction (the direction of the arrow X), and has an L-shaped cross-sectional shape. Protruding portions 132 that protrude outward in the longitudinal direction are formed at both ends of the metal plate 130 in the longitudinal direction. One end of the above-mentioned biasing member is attached to each protruding portion 132.

As shown in FIG. 2, the longitudinal direction of the metal plate 130 is arranged so as to be directed to the direction (the direction of arrow Z) of the rotational axis of the heating roller 110. The metal plate 130 holds pressing portion 128 at one end side in the lateral direction, and holds the guide portion 126 at the other end.

The sheet member 134 is arranged between the pressing portion 128 and the inner peripheral surface of the endless belt 122. The sheet member 134 is made of, for example, polytetrafluoroethylene (PTFE) and is provided to reduce the sliding resistance in the nip N of the endless belt 122.

Figure 4:
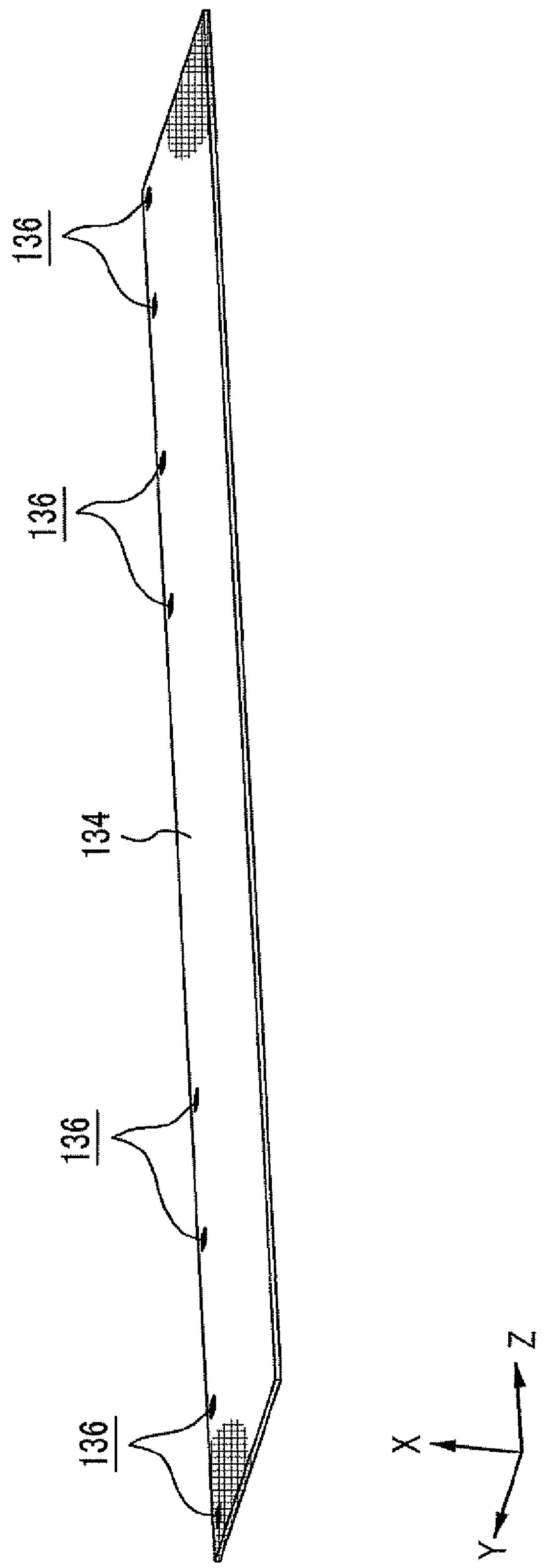
FIG. 4 is a perspective view showing a sheet member of the pressing member of the fixing device related to the exemplary embodiment of the invention.

As shown in FIG. 4, the sheet member 134 has a thin sheet shape, and has flexibility. Plural (for example, eight) through holes 136 are provided along the longitudinal direction (the direction of the arrow Z) at one end of the sheet member 134 in the lateral direction (the direction of the arrow Y). As shown in FIG. 2, the sheet member 134 is locked to the inner surface 128*a* of the pressing portion 128 by locking portions 162 (that will be described below) that have passed through the through holes 136, and is folded back so as to run along in the outer surface 128*b* of pressing portion 128, and most of the sheet member is arranged between the pressing portion 128 and the inner peripheral surface of the endless belt 122.

Figure 5:
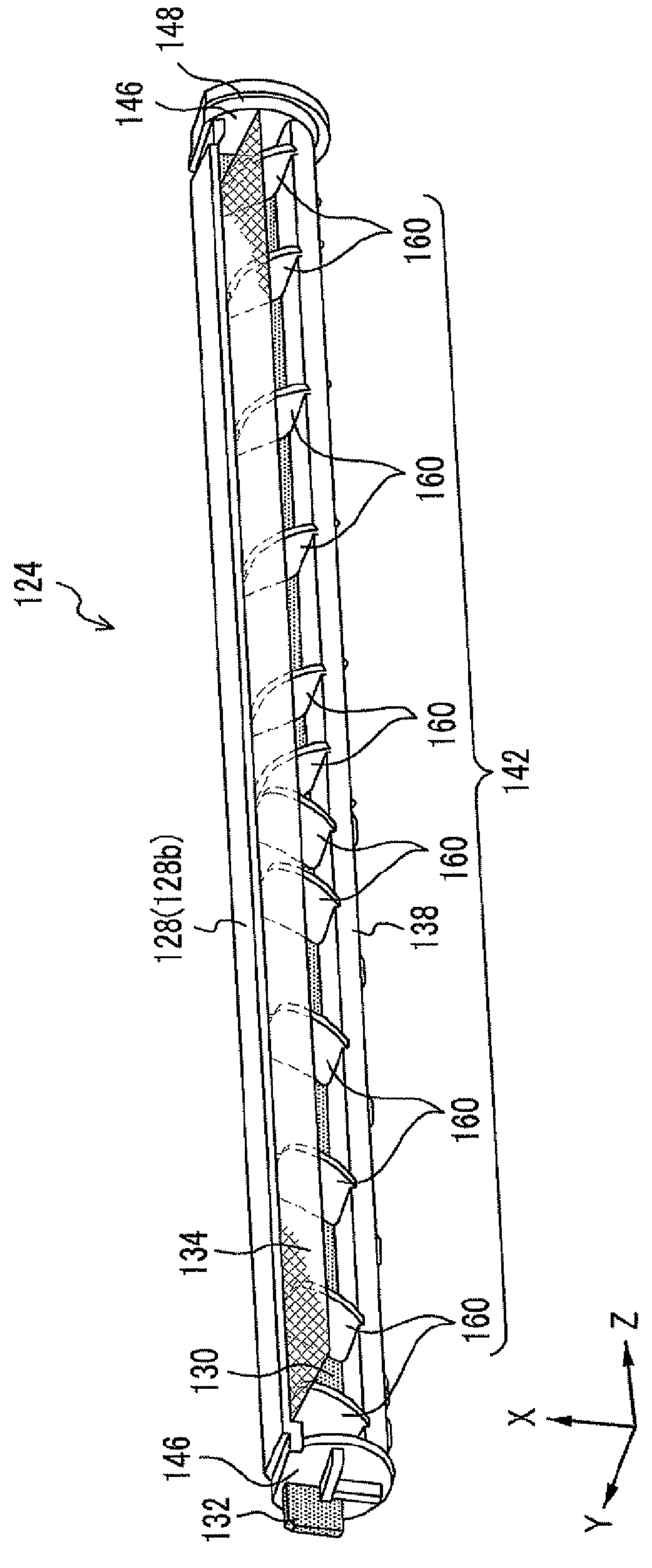
FIG. 5 is a perspective view showing the pressing member of the fixing device related to the exemplary embodiment of the invention.
Figure 6:
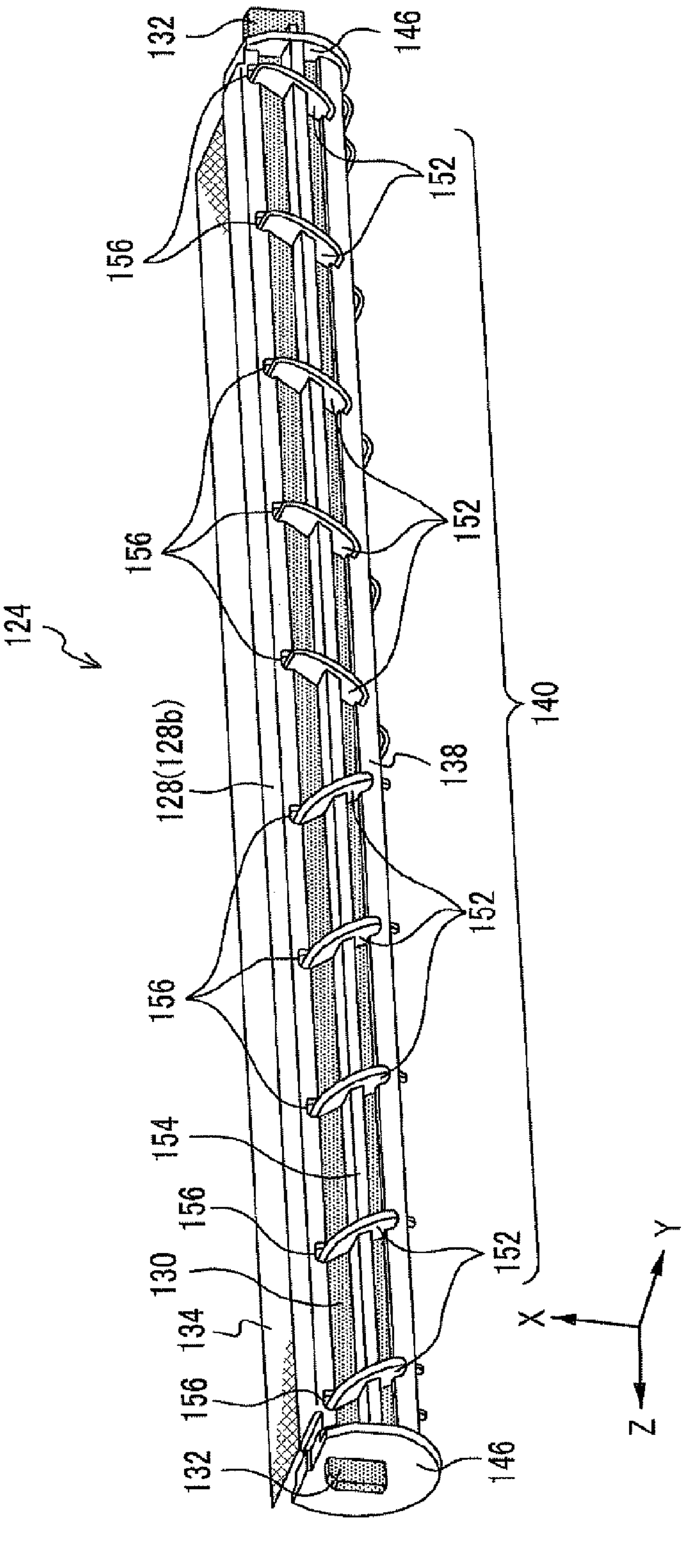
FIG. 6 is a perspective view showing the pressing member of the fixing device related to the exemplary embodiment of the invention as seen from the side opposite to FIG. 5.

As shown in FIGS. 2, 5, and 6, the pressing portion 128 has a long shape, and is attached to one end of the metal plate 130 in the lateral direction such that the longitudinal direction thereof runs along the longitudinal direction of the metal plate 130.

As shown in FIGS. 2 to 10, the guide portion 126 includes a long portion 138 that is attached to the other end of the metal plate 130 in the lateral direction so as to run along the longitudinal direction of the metal plate 130, a first rib group 140 serving as an example of plural ribs that are connected to the long portion 138 and extend toward the pressing portion 128, a second rib group 142 that are provided on the side opposite to the first rib group 140 across the metal plate 130, are connected to the long portion 138 and extend toward the pressing portion 128, and a third rib group 144 that protrudes outward to the side opposite to the pressing portion 128 in the direction of the arrow X from the long portion 138.

As shown in FIGS. 5 and 6, the pressing portion 128 and the long portion 138 are connected to each other at both ends thereof in the longitudinal direction (the direction of the arrow Z) by side portions 146. The side portions 146 have a substantially round shape as seen from the direction of the arrow Z, and one of the side portions 146 has an overhang portion 148 that overhangs from the outer periphery, and specifies the position of the endless belt 122 in the direction of the arrow Z, as shown in FIG. 2. In addition, the endless belt 122 is prevented from falling out from the pressing member 124 by mounting the endless belt 122 on the pressing member 124 shown in FIGS. 5 and 6 from the other side portion 146 side (when the endless belt 122 is mounted, the sheet member 134 is folded back so as to run along the outer surface 128*b* of the pressing portion 128), and fitting a cap member (not shown) having the same shape as the overhang portion 148 to the other side portion 146.

The pressing portion 128, the long portion 138, the first rib group 140, the second rib group 142, the third rib group 144, and the side portions 146 are made of, for example, a resin material, such as polyethylene terephthalate (PET). The pressing member 124, as will be described below, is an insert molded article that is formed such that the metal plate 130 and the sheet member 134 are integrated by a resin material by pouring the resin material (molten resin) into a cavity 302 of the mold 304 in a state where the metal plate 130 and the sheet member 134 are inserted.

As shown in FIG. 2, nonwoven fabric (felt) 150 is attached to the position of the long portion 138 that faces the inner peripheral surface of the endless belt 122, along the direction of the arrow Z. A lubricating oil is dyed in the nonwoven fabric 150, and the lubricating oil is carried from the nonwoven fabric 150 while the endless belt 122 rotationally moves, contacting the nonwoven fabric 150. As the lubricating oil is distributed to the inner peripheral surface of the endless belt 122, the sliding resistance of the endless belt 122 decreases, and the rotational movement of the endless belt 122 becomes smooth.

Figures 8A, 8B, 8C:
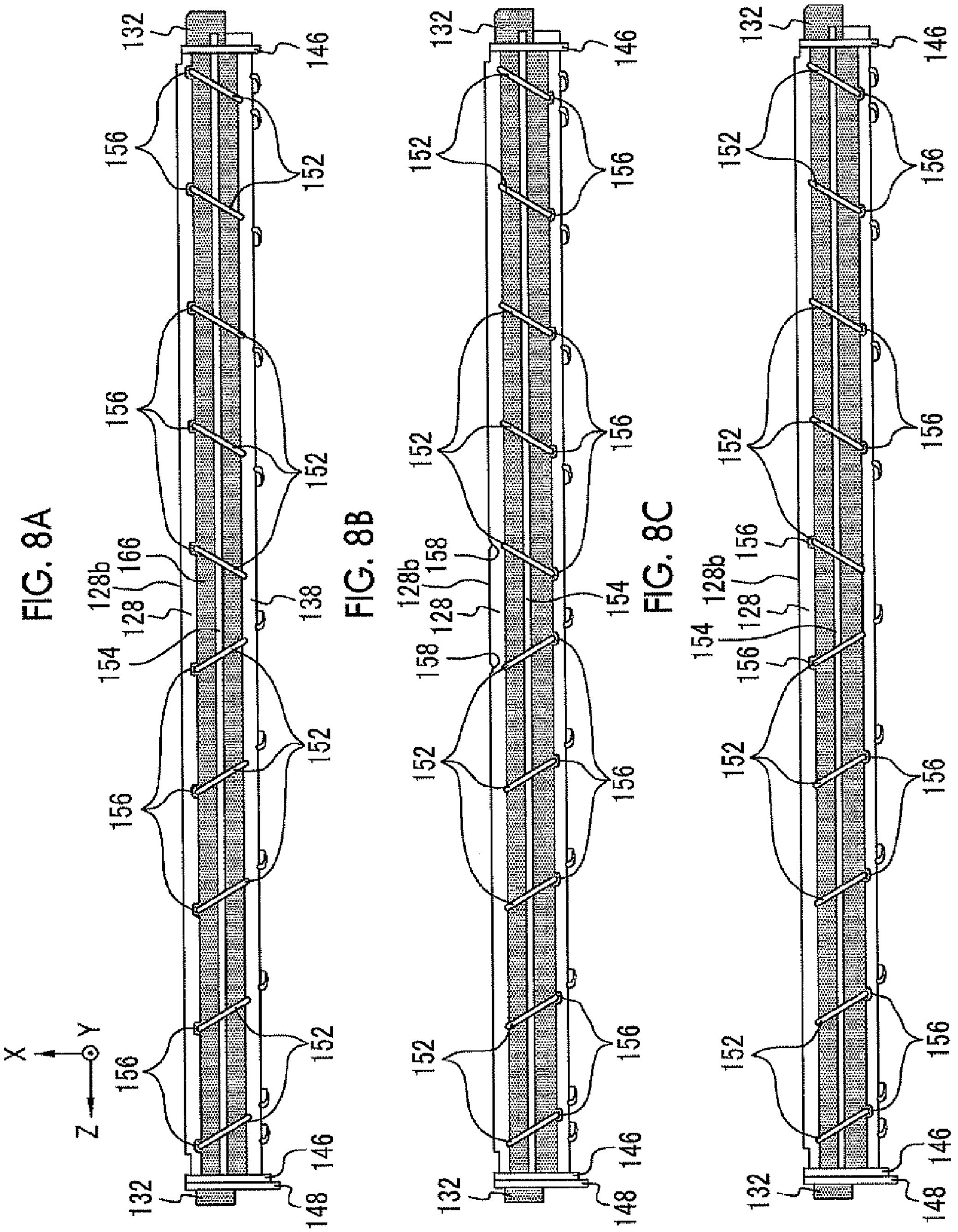
FIG. 8A is a top view of the pressing member of the fixing device related to the exemplary embodiment of the invention.
FIGS. 8B and 8C are top views of the pressing member that has a first rib group of a form different from the first rib group shown in FIG. 8A.
Figure 9:
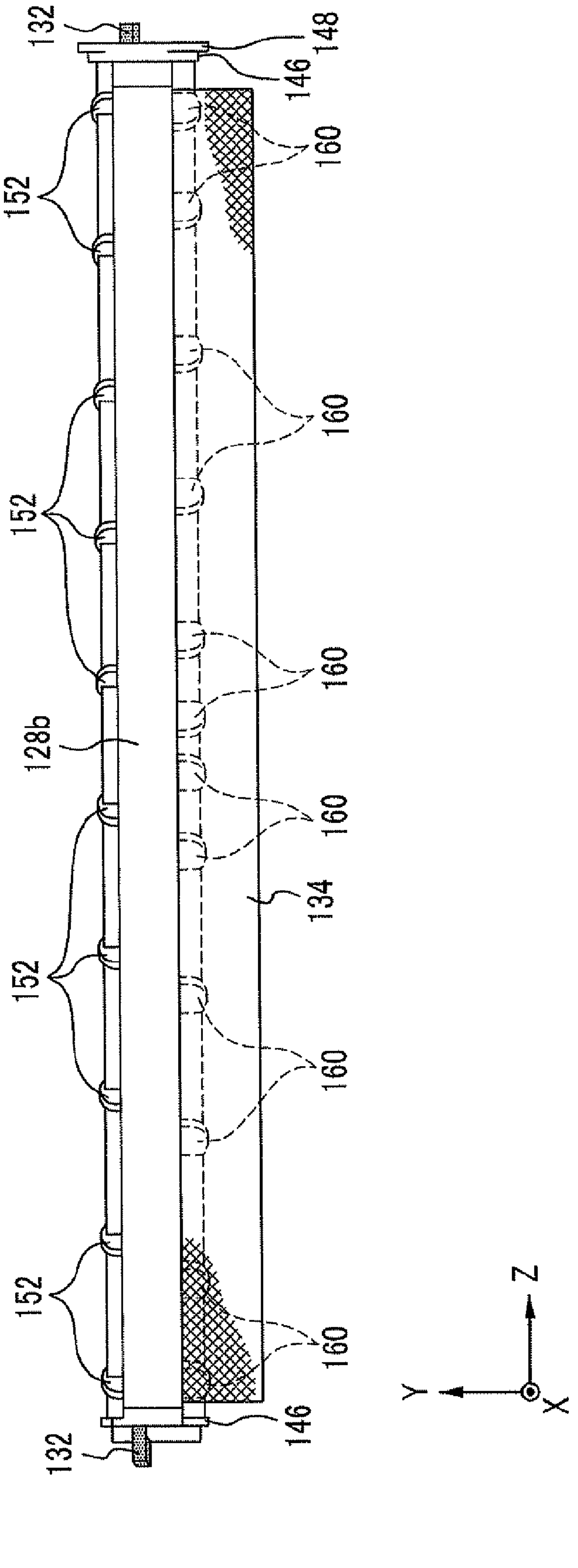
FIG. 9 is a side view as seen from the pressing portion side of the pressing member of the fixing device related to the exemplary embodiment of the invention.

As shown in FIGS. 2, 6, and 8A, the first rib group 140 is located on the downstream side of the nip portion N in the rotational direction of the endless belt, and is composed of plural (for example, ten) ribs 152 provided at intervals in the longitudinal direction (the direction of the arrow Z) of the metal plate 130. Each rib 152 of the first rib group 140 is formed so as to overhang in the direction of the arrow Y from the metal plate 130, and the tip portion thereof has an arcuate shape as seen from the direction of the arrow Z so as to guide the rotational movement of the endless belt 122. The first rib group 140 is formed with a connecting portion 154 that connects the respective ribs 152 together.

Although each rib 152 of the first rib group 140 is connected to the long portion 138 and extends toward the pressing portion 128, the rib is configured so as not to be connected to the pressing portion 128. Specifically, a relief groove 156 is formed in the pressing portion 128 so that each rib 152 of the first rib group 140 is not connected.

As shown in FIG. 8B, as another form of the first rib group 140 shown in FIG. 8A, each rib 152 of the first rib group 140 is connected to the pressing portion 128, and the relief groove 156 is formed in the long portion 138 so as not to be connected to the long portion 138.

Figure 13:
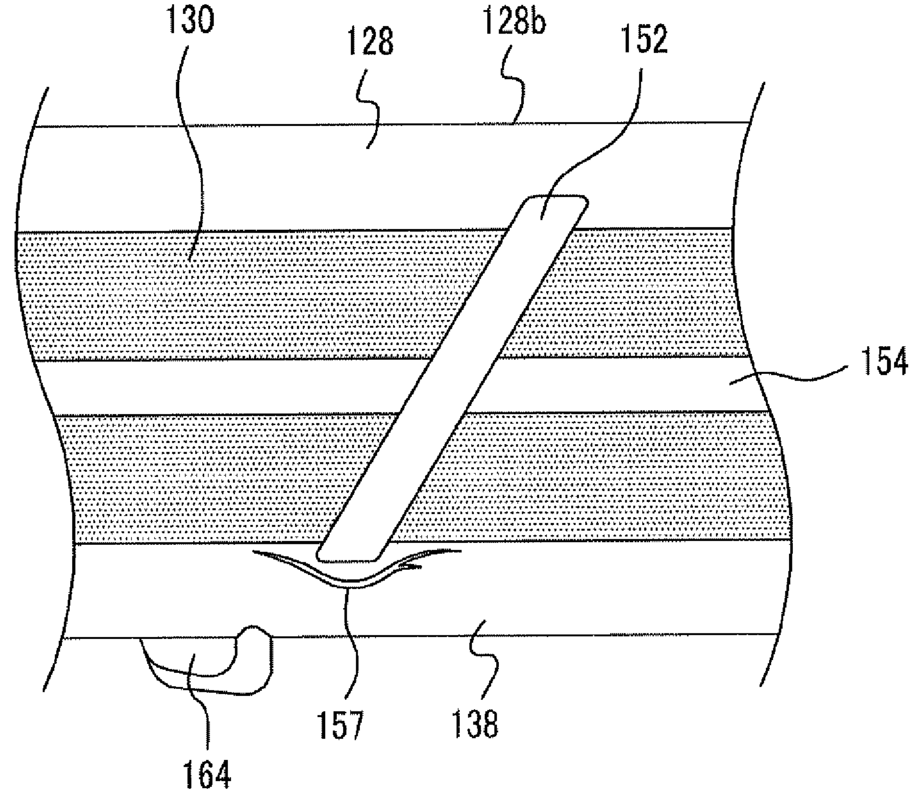
FIG. 13 is a view showing the crack produced in the connecting proximal end of a rib in a pressing member of a configuration in which each rib of the first rib group is connected to both the long portion and the pressing portion, as the comparative example of the pressing member of the fixing device related to the exemplary embodiment of the invention.

The reason why such a configuration in which each rib 152 of the first rib group 140 is connected to either the pressing portion 128 or the long portion 138, and is not connected to the other is adopted, as shown in FIG. 13, is because, when each rib 152 of the first rib group 140 is connected to both the pressing portion 128 and the long portion 138, the heat distortion caused by the thermal expansion difference between the pressing portion 128 and the long portion 138 acts on each rib 152 in the heat cycle of the fixing device 100, and a crack 157 is generated at a connecting proximal end of each rib 152.

As shown in FIG. 8B, in the configuration in which each rib 152 of the first rib group 140 is connected to the pressing portion 128, a thermal contraction portion (sink) 158 is generated at a position corresponding to a rib connection place of the central portion of the outer surface 128*b* of the pressing portion 128 in the direction of the arrow Z. This is because the pressing portion 128 is formed such that the thickness of the central portion thereof in the longitudinal direction (the direction of the arrow Z) is greater than the thickness of the end thereof (the thickness here indicates the thickness in the direction of the arrow X, and the difference in thickness between the central portion and the end is very slight. Therefore, although not clearly shown in the drawing, the outer surface 128*b* of the pressing portion 128 has a profile that is convexly curved in the thickness direction at the central portion), and the amount of thermal contraction of the central portion at the time of insert molding at the position corresponding to the rib connection place of the outer surface 128*b* of the pressing portion 128 becomes greater than that of the end. Since a pressing force that presses the endless belt 122 against the heating roller 110 decreases when the thermal contraction portion 158 is generated in the outer surface 128*b* of the pressing portion 128, this becomes a factor that degrades the fixing performance of the fixing device 100.

In order not to generate the thermal contraction portion 158 in the outer surface 128*b* of the pressing portion 128, as for the connection aspect of each rib 152 of the first rib group 140, the connection aspect shown in FIG. 8A is more desirable than the connection aspect shown in FIG. 8B. In addition, as shown in FIG. 8C, a connection aspect in which only the rib 152 of the central portion among the respective ribs 152 of the first rib group 140 is connected to the long portion 138 and is not connected to the pressing portion 128 may be adopted.

Figure 7:
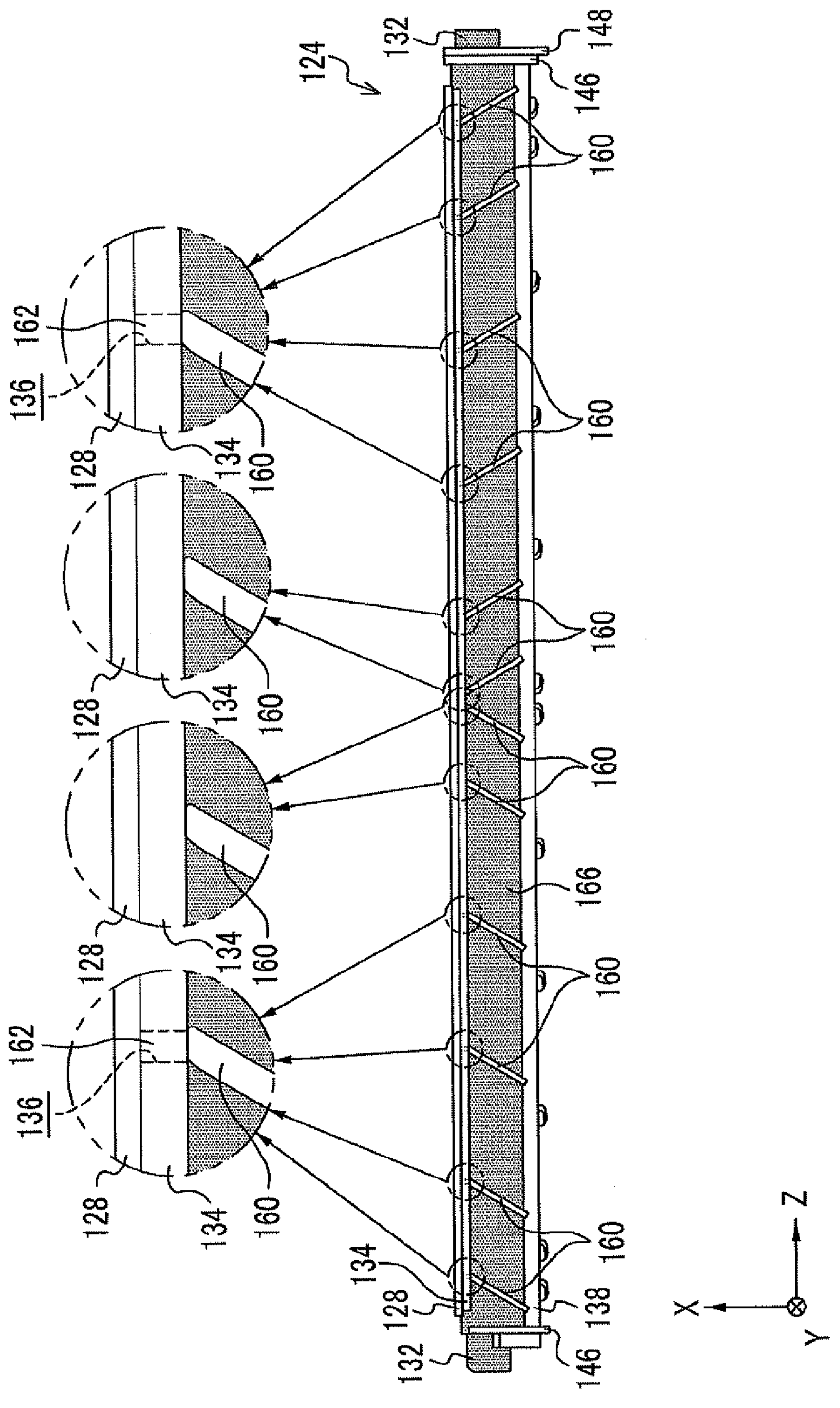
FIG. 7 is a bottom view of the pressing member of the fixing device related to the exemplary embodiment of the invention.

As shown in FIGS. 2, 5, and 7, the second rib group 142 is composed of plural (for example, twelve) ribs 160 provided at intervals in the longitudinal direction (the direction of the arrow Z) of the metal plate 130. Each rib 160 of the second rib group 142 is formed so as to overhang in the direction of the arrow Y from the metal plate 130, and the tip portion thereof has an arcuate shape as seen from the direction of the arrow Z so as to guide the rotational movement of the endless belt 122.

Four ribs 160 in the vicinity of the center in the direction of the arrow Z among the twelve ribs 160 are connected to the long portion 138, and extend toward the pressing portion 128, but are not connected to the pressing portion 128. The eight remaining ribs 160 in the vicinity of both ends are connected to the long portion 138, and extend toward the pressing portion 128, and are connected to the pressing portion 128 through the columnar locking portions 162. Since each locking portion 162 is passed through each corresponding through hole 136 of the sheet member 134, the sheet member 134 is prevented from falling out from between each rib 160 and the inner surface 128*a* of the pressing portion 128. In other words, the pressing member 124 is insert-molded such that one end of the sheet member 134 in the lateral direction is held between each rib 160 of the second rib group 142, and the pressing portion 128.

The reason why the locking portions 162 are not provided in four ribs 160 in the vicinity of the center in the second rib group 142 is in order to prevent the thermal contraction portion (sink) 158 from being generated in the outer surface 128*b* of the pressing portion 128, as described with reference to FIG. 8B.

Figure 10:
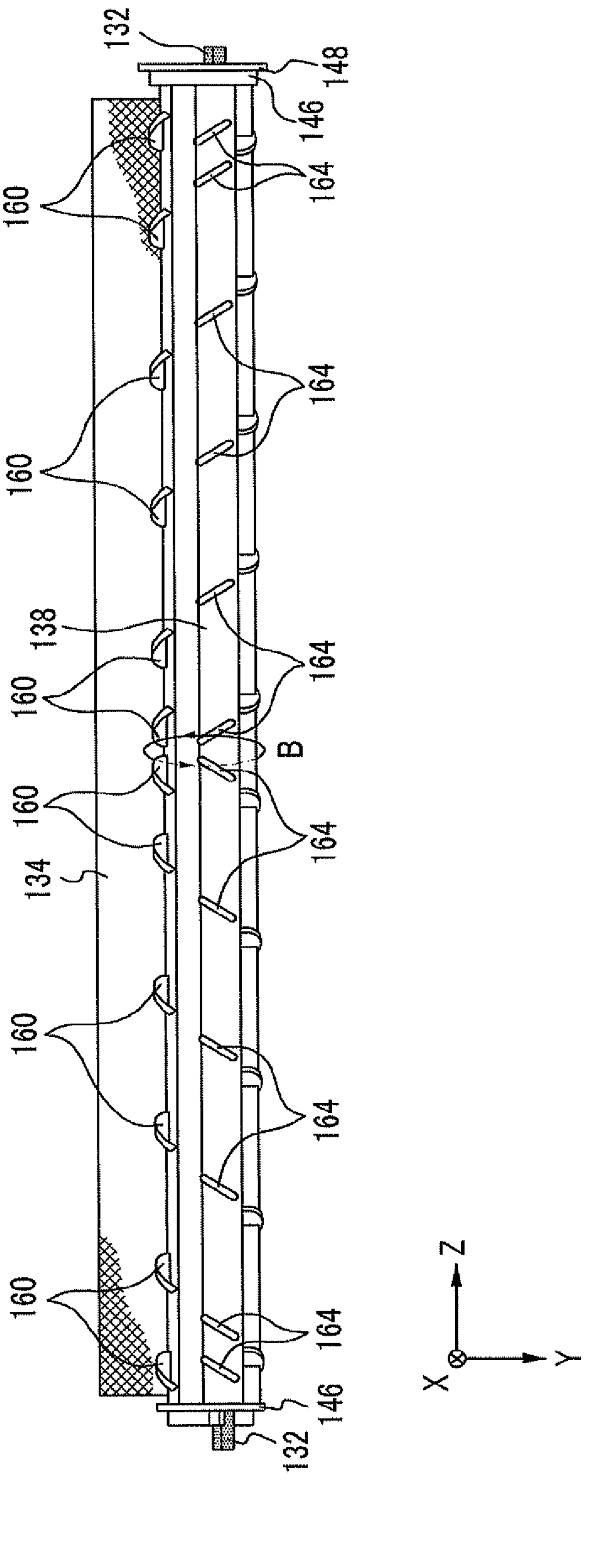
FIG. 10 is a side view as seen from the long portion side of the pressing member of the fixing device related to the exemplary embodiment of the invention.

As shown in FIGS. 2 and 10, the third rib group 144 is composed of plural (for example, twelve) ribs 164 provided at intervals in the longitudinal direction (the direction of the arrow Z) of the long portion 138. A tip portion of each rib 164 of the third rib group 144 has an arcuate shape as seen from the direction of the arrow Z so as to guide the rotational movement of the endless belt 122.

In addition, as shown in FIG. 10, the respective ribs 152, 160, and 164 of the first rib group 140, the second rib group 142, and the third rib group 144 are symmetrically formed with respect to the center in the longitudinal direction, and are formed in a truncated chevron shape as seen with the rotational direction B of the endless belt 122 being turned upward. This is because the lubricating oil comes nearer to the center in the direction of the arrow Z by the rotational movement of the endless belt 122 inside the endless belt 122, and the lubricating oil is kept from leaking out from a gap in the side portions 146.

Figure 11A:
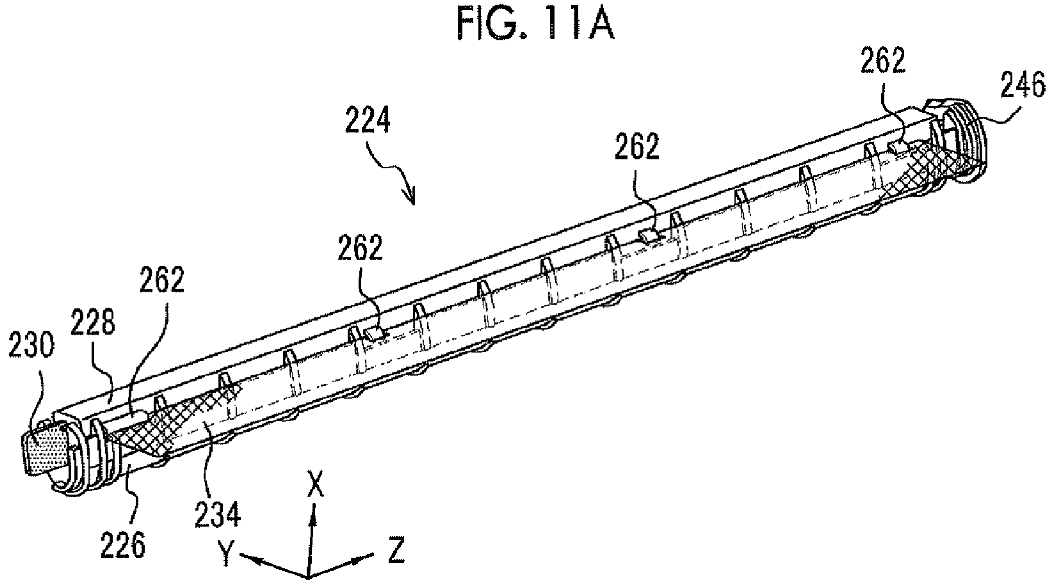
FIG. 11A is a perspective view showing the pressing member serving as a comparative example of the pressing member of the fixing device related to the exemplary embodiment of the invention.
Figure 11B:
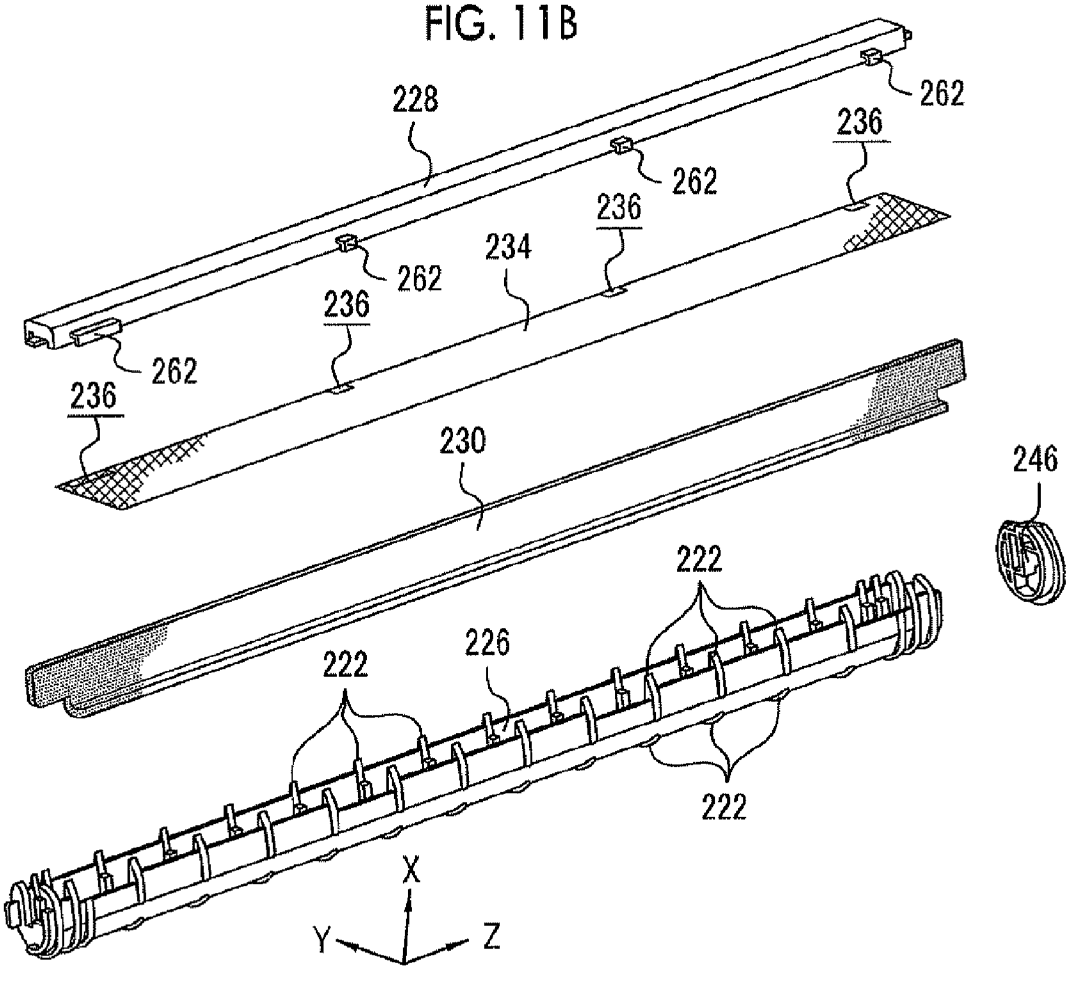
FIG. 11B is an exploded perspective view thereof.
Figure 12:
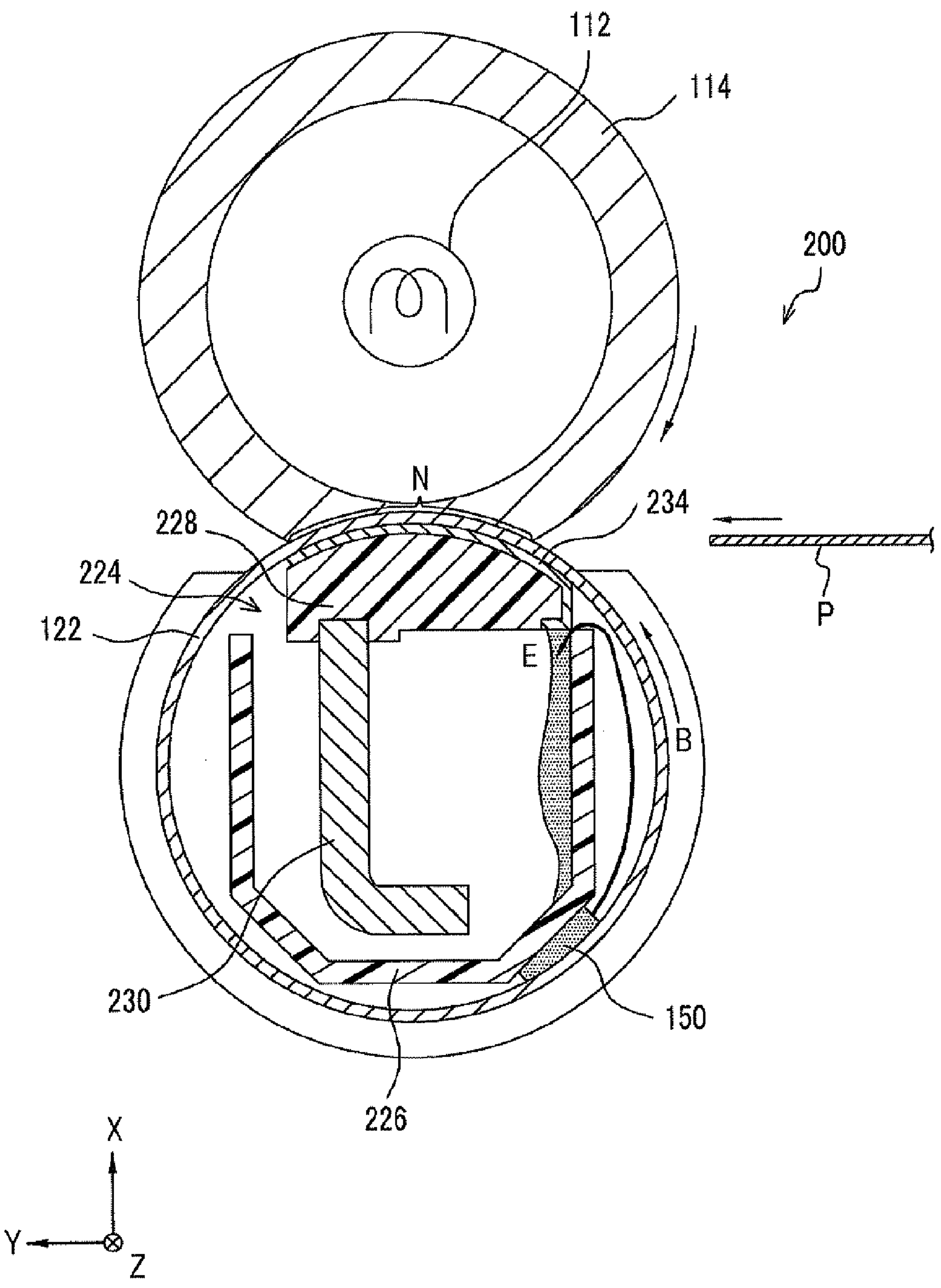
FIG. 12 is a cross-sectional view showing the fixing device when the pressing member serving as the comparative example of the pressing member of the fixing device related to the exemplary embodiment of the invention is used.

FIG. 11A is a perspective view showing a pressing member 224 serving as a comparative example against the pressing member 124 of the present exemplary embodiment shown in FIG. 5 and the like. FIG. 11B is an exploded perspective view thereof. FIG. 12 is a cross-sectional view similar to FIG. 2 showing a fixing device 200 having the pressing member 224 serving as the comparative example.

As shown in FIG. 11B, the pressing member 224 is not an insert molded article but is configured as a separate part from a guide portion 226, a pressing portion 228, side portions 246, a metal plate 230, and a sheet member 234, and is a collective part formed by assembling these five parts.

The guide portion 226 of the pressing member 224 has a shape that has a U-shaped box-shaped cross-section, and the outer peripheral surface thereof is formed with plural ribs 222 that contact the inner peripheral surface of the endless belt 122. The metal plate 230 is assembled so as to be received inside the guide portion 226. The sheet member 234 is attached to the pressing portion 228 as the through holes 236 provided at one end thereof are passed over locking portions 262 provided in the pressing portion 228.

Although the guide portion 226 and one of the side portions 246 in the pressing member 224 are made of a resin material, such as polyethylene terephthalate (PET), the pressing portion 228 is made of a material with high strength as compared to polyethylene terephthalate (PET) referred to as, for example, a liquid crystal polymer (LCP). The reason why a high-strength material is used for the pressing portion 228 of the pressing member 224 is because bending rigidity is required for the pressing portion 228.

In contrast, in the pressing member 124 of the present exemplary embodiment, the pressing portion 128 is made of polyethylene terephthalate (PET). However, as the guide portion 126, the pressing portion 128, the side portions 146, and the metal plate 130 are integrated by insert molding, the pressing portion 128 has sufficient bending rigidity.

If the pressing member 124 of the present exemplary embodiment and the pressing member 224 serving as the comparative example are described in contrast with each other referring to FIGS. 2 and 12, the guide portion 126 in the pressing member 124 has the first rib group 140 and the second rib group 142 erected at intervals in the direction of the arrow Z from the long portion 138. Thus, most of the metal plate 130 faces the inner peripheral surface of the endless belt 122. In other words, the pressing member 124 is insert-molded so as to have a portion (an exposed portion 166 shown in FIG. 7 and FIG. 8A) where the metal plate 130 and the inner peripheral surface of the endless belt 122 face each other.

In the portion where the metal plate 130 and the inner peripheral surface of the endless belt 122 face each other, as indicated by an arrow C in FIG. 2, a reflector effect is produced in which the radiant heat from the endless belt 122 is reflected on the surface of the metal plate 130, and is returned to the endless belt 122. For this reason, wasteful loss of the heat from the heating roller 110 in the endless belt 122 is suppressed. That is, the heat of the endless belt 122 is effectively used due to the reflector effect. In contrast, in the pressing member 224, as shown in FIG. 12, the guide portion 226 is formed in the shape of a box having a U-shaped cross-section, and is configured so as to receive the metal plate 230 therein. Therefore, the metal plate 230 does not have a portion that faces the inner peripheral surface of the endless belt 122 in the direction of the arrow Z. Therefore, the reflector effect is not produced in the pressing member 224.

Additionally, in the pressing member 124, as indicated by an arrow D in FIG. 2, most of the lubricating oil supplied from the nonwoven fabric 150 is scraped off at a position where the sheet member 134 and the endless belt 122 contact each other, and is returned to the nonwoven fabric 150. In contrast, in the pressing member 224, as indicated by an arrow E in FIG. 12, the lubricating oil scraped off at a position where the sheet member 234 and the endless belt 122 contact each other enters the guide portion 226, and there is lubricating oil that does not return to the nonwoven fabric 150. Therefore, the utilization rate of the lubricating oil decreases.

Moreover, the amount of resin to be used for the pressing member 124 is reduced by about 23% compared to the amount of resin to be used for the pressing member 224. Additionally, expensive liquid crystal polymer (LCP) is used for the pressing portion 228 of the pressing member 224. That is, the pressing member 124 has a low material cost compared to the pressing member 224.

Additionally, although the pressing member 224 requires the work for assembling five parts, since the guide portion 126, the pressing portion 128, the side portions 146, the metal plate 130, and the sheet member 134 as insert parts are integrally molded, the pressing member 124 does not require the assembling work. That is, the pressing member 124 has a low assembling cost compared to the pressing member 224.

If additional description is made about the configuration of the pressing member 124 of the present exemplary embodiment, as shown in FIG. 2, as seen from a cross-section in which the direction of rotation of the heating roller 110 and the endless belt 122 may be seen, the centerline L1 of the portion of the metal plate 130 that is directed to the direction of the arrow X is provided at a position that is biased (offset) in the direction of the arrow Y from the centerline L2 including the center of rotation of the heating roller 110 and the center of rotation of the endless belt 122. This is because a strongest pressing force is given on the downstream side of the central portion of the nip portion N in the conveying direction of the recording paper P in order to improve the self-peelability of the recording paper P that has passed through the nip portion N, and the metal plate 130 is arranged at the position where the strongest pressing force is given, thereby suppressing occurrence of bending in the pressing portion 128.

On the other hand, in a case where the amounts of resin on both sides that exist across the metal plate 130 are not uniform, warpage occurs in the metal plate 130 due to the difference between the amounts of thermal contraction of the resin material in insert molding. Therefore, the connecting portion 154 is provided in the first rib group 140 so as to compensate for the amount of resin on the side of the metal plate 130 offset from the centerline L2. That is, the pressing member 124 is configured such that the connecting portion 154 is provided in the first rib group 140, thereby making the amounts of the resin material on both sides that exist across the centerline L1 of the metal plate 130 uniform, and suppressing the occurrence of warpage in the metal plate 130. Here, it may be said that "both sides (both sides of the metal plate 130) that exist across the metal plate 130" are outside a plane with largest area, and outside a plane that faces the plane with largest area, among the plural planes that constitute the metal plate 130.

(Molding Apparatus)

Next, a molding apparatus 300 used for the manufacture of the pressing member 124 that is an insert molded article will be described with reference to FIGS. 14 to 20B. The up-and-down direction of the molding apparatus 300 is described as the direction of an arrow y, the right-and-left direction is described as the direction of an arrow x, and the depth direction is described as the direction of an arrow z.

As shown in FIGS. 14 to 17, the molding apparatus 300 includes a mold 304 having a cavity 302 that has a substantially cylindrical shape in a cross-sectional view and is long in the direction of the arrow z. The mold 304 has a fixed mold 306 fixed to a base (not shown) of the apparatus, and a movable mold 308 that is movable in the direction of the arrow x. A heating device 310 that is connected to the fixed mold 306 and the movable mold 308 to heat the fixed mold 306 and the movable mold 308 is provided outside the mold 304. Here, the heating device 310 is a temperature adjusting device (temperature controller) that controls the temperature of the mold 304 and a pinching member 318 to a predetermined temperature via media (water, oil, or the like).

The fixed mold 306 is provided with an inlet 312 for pouring the molten resin (resin material) injected from an injection machine (not shown) into the cavity. One inlet 312 is provided at a position that faces the cavity 302 at one end of the fixed mold 306 in the direction of the arrow z.

A wall surface of the fixed mold 306 is provided with a suction port 314 for suctioning and fixing the sheet member 134. Plural suction ports 314 (only one port is shown in the drawing) are provided at intervals along the direction of the arrow z, and the sheet member 134 is suctioned and fixed to the fixed mold 306 such that the longitudinal direction thereof is directed to the direction of the arrow z and one end thereof in the lateral direction (the direction of the arrow y) is inserted into the cavity 302.

Figure 17:
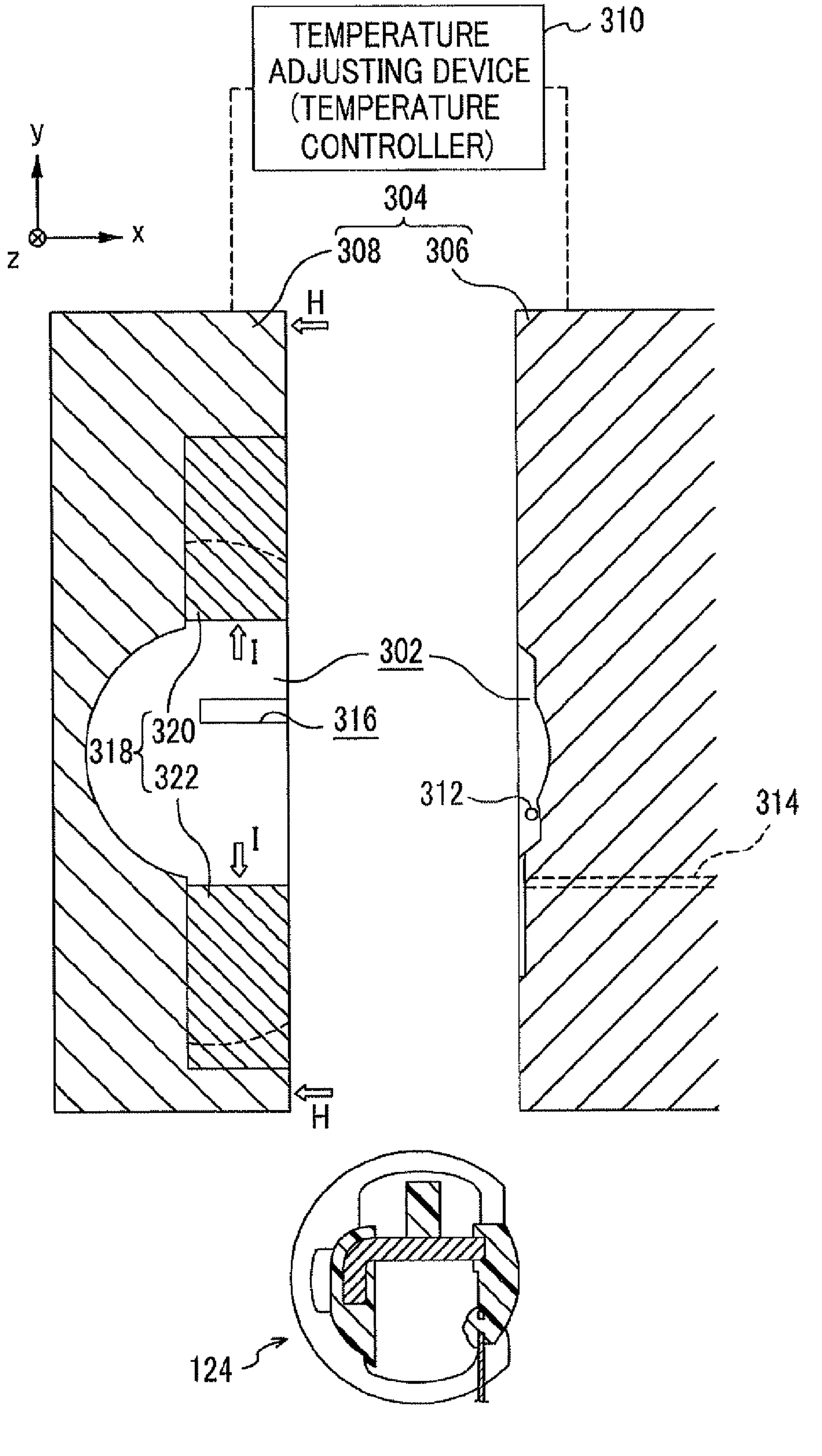
FIG. 17 is a cross-sectional view of the mold showing a state where the mold shown in FIG. 16 is opened, and the pressing member that is an insert molded article is taken out.

The movable mold 308 is provided with positioning grooves 316 (refer to FIGS. 14 and 17) for positioning the metal plate 130 within the cavity 302. The positioning grooves 316 are respectively provided at both ends of the movable mold 308 in the direction of the arrow z (only one groove is shown in FIGS. 14 and 17).

Figure 14:
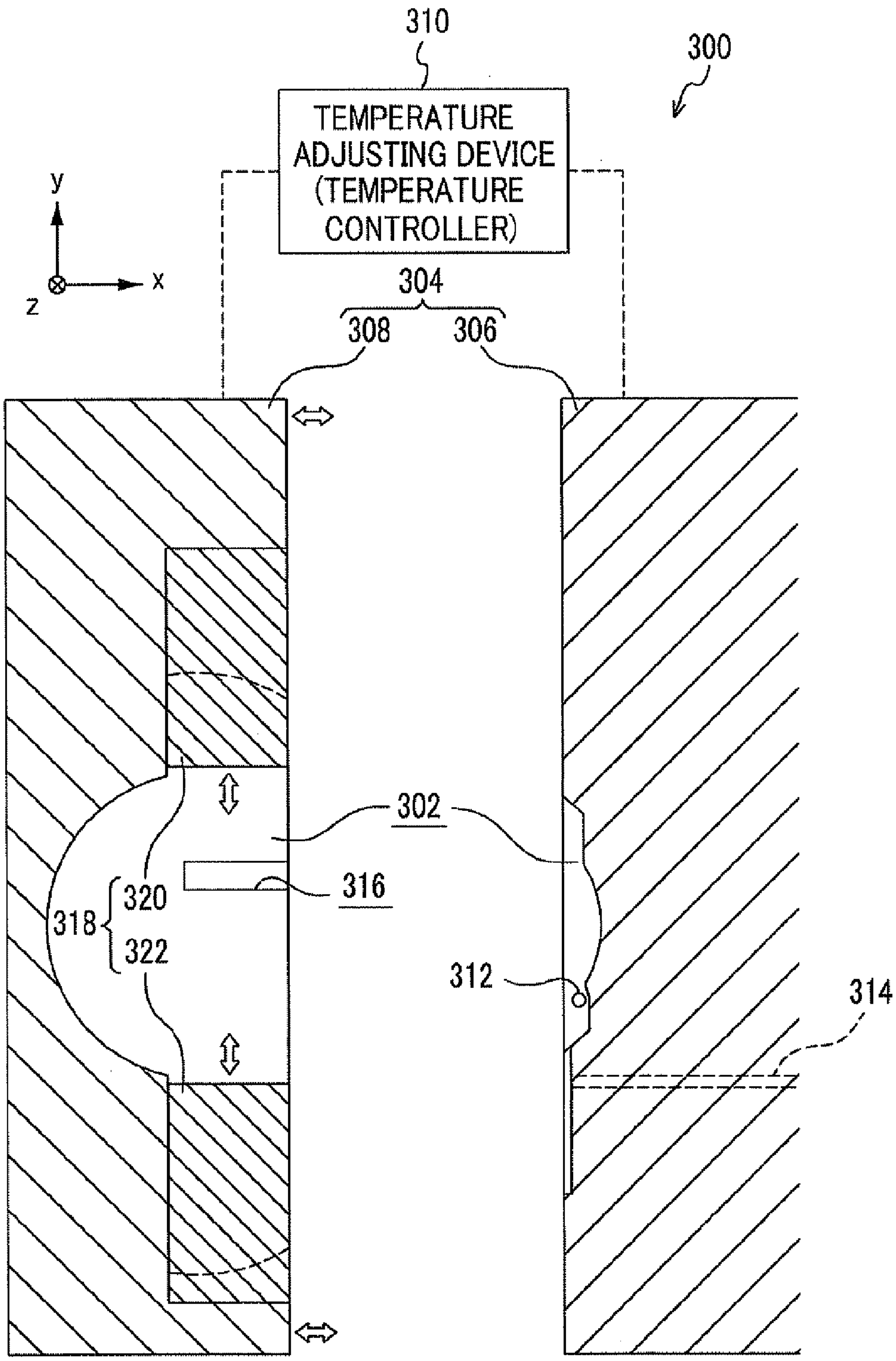
FIG. 14 is a cross-sectional view showing a mold used for manufacture of the pressing member of the fixing device related to the exemplary embodiment of the invention.
Figure 15:
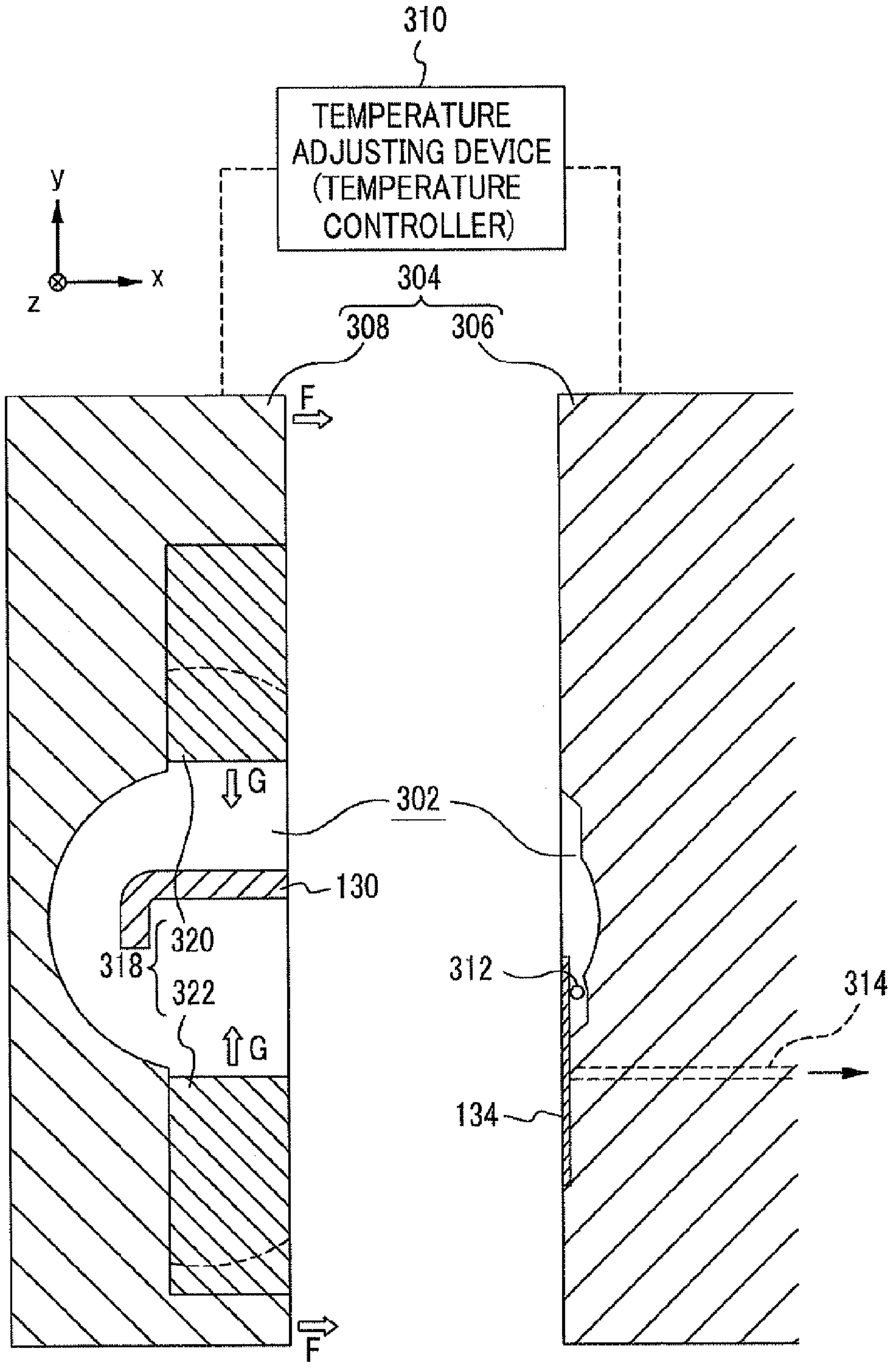
FIG. 15 is a cross-sectional view showing the mold in a state where the metal plate and the sheet member serving as insert parts are arranged in the mold shown in FIG. 14.

As shown in FIGS. 14 and 15, the metal plate 130 is positioned in a cavity 302 as the longitudinal direction thereof is directed to the longitudinal direction (the direction of the arrow z) of the cavity 302, and the protruding portions 132 of the metal plate 130 are fitted into the positioning grooves 316.

The movable mold 308 is provided with the pinching member 318 that is movable in the direction of the arrow y. The pinching member 318 is composed of an upper movable core 320 and a lower movable core 322, and as shown in FIG. 15, the upper movable core 320 and the lower movable core 322 are adapted to move in a pinching direction G in which the metal plate 130 is pinched in conjunction with the movement of the movable mold 308 in a clamping direction F, respectively. Additionally, as shown in FIG. 17, the upper movable core 320 and the lower movable core 322 are adapted to move in a non-pinching direction I in which the metal plate 130 is not pinched in conjunction with the movement of the movable mold 308 in a molding opening direction H, respectively.

Figure 16:
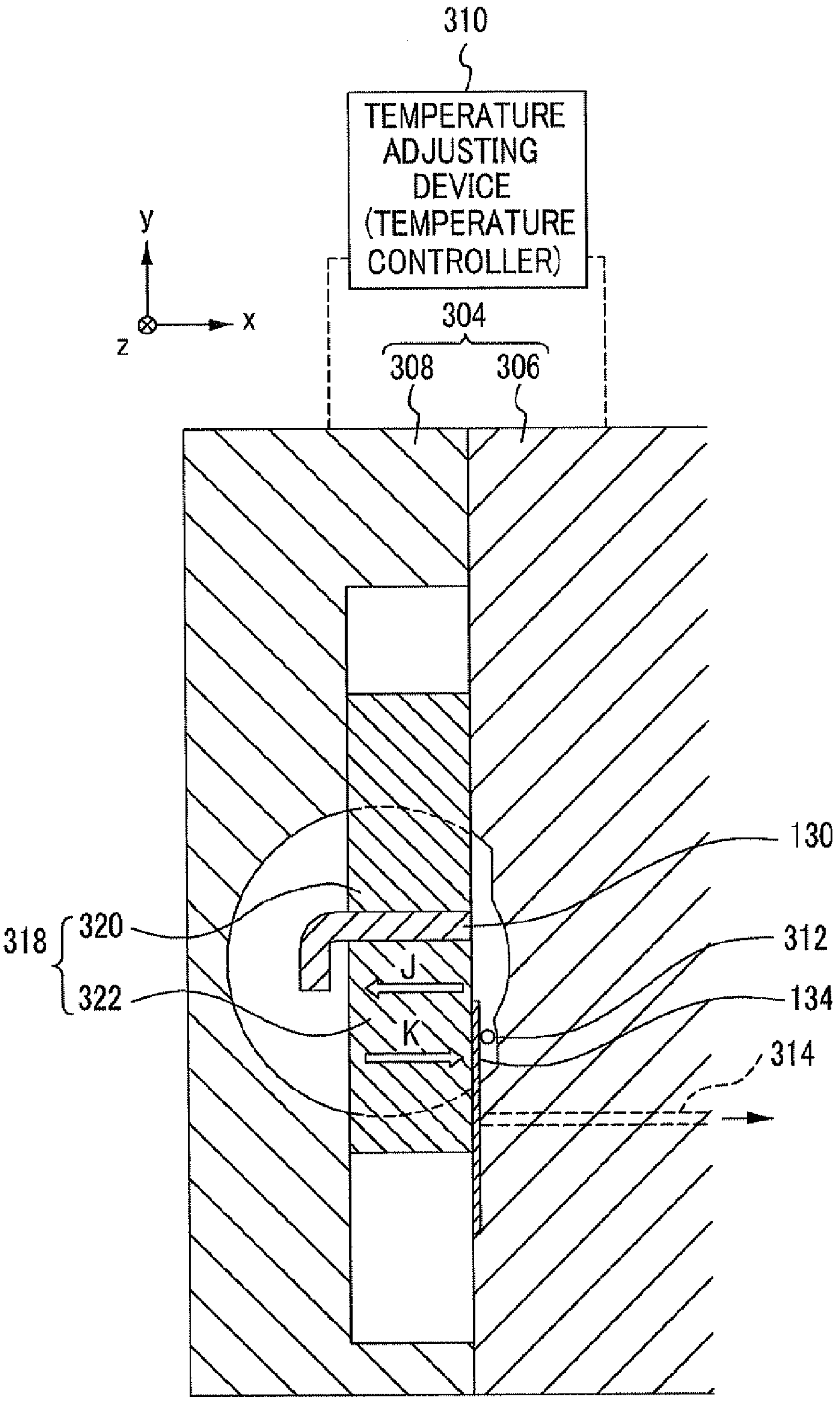
FIG. 16 is a cross-sectional view of the mold showing a state where the mold shown in FIG. 15 is clamped.

As shown in FIG. 16, the metal plate 130 is pinched by the pinching member 318 at a position offset from the center of the cavity 302 as seen from a cross-section (the cross-section of the cavity 302 in the lateral direction) of the cavity 302. Here, if the center of the cavity 302 is expressed in other way, the center of the cavity becomes the center of turning (design value) of the endless belt 122, assuming that the endless belt 122 has been mounted on an insert molded article (pressing member 124) insert-molded within the cavity 302. Resin material is poured into the cavity 302 in a state where the metal plate 130 is pinched by the pinching member 318. As mentioned above, in order to suppress the occurrence of warpage an the metal plate 130 due to the difference in the amount of thermal contraction of the resin material in insert molding, the shapes of the fixed mold 306, the movable mold 308, the upper movable core 320, and the lower movable core 322 are determined so that the amounts of the resin material on the both sides that exist across the metal plate 130 in the cavity 302 become uniform.

Figure 18:
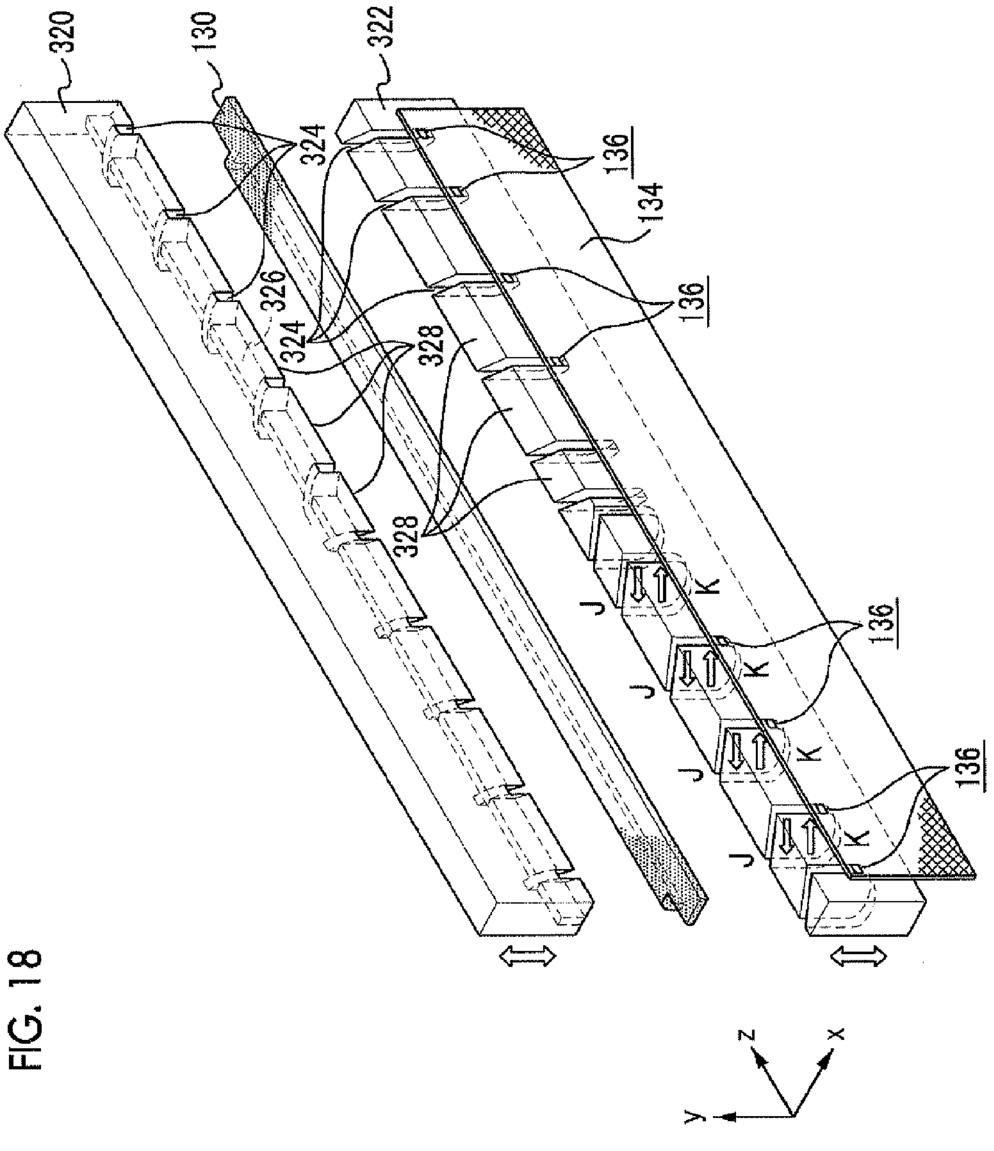
FIG. 18 is a perspective view mainly showing a pinching member of the mold shown in FIG. 14.

Specifically, as shown in FIG. 18, the upper movable core 320 and the lower movable core 322 are respectively formed with grooves 324 for a rib for forming the first rib group 140 and the second rib group 142, and the upper movable core 320 is formed with a groove 326 for a connecting portion for forming the connecting portion 154. By providing the groove 326 for a connecting portion, the amounts of the resin material on the both sides that exist across the metal plate 130 in the cavity 302 become uniform.

As shown in FIG. 18, the upper movable core 320 and the lower movable core 322 respectively have a configuration in which the metal plate 130 is pinched by plural pinching portions 328 that are split in the longitudinal direction (the direction of the arrow z) of the cavity 302 by the grooves 324 for a rib (the upper movable core 320 is further split by the groove 326 for a connecting portion also in the lateral direction (the direction of the arrow x)). Additionally, the pinching portions 328 of the upper movable core 320 and the lower movable core 322 are adapted to pinch the metal plate 130 so as to push and cut the metal plate 130 (reduce the thickness of the metal plate 130). In other words, when the mold 304 is clamped, the travel distances of the upper movable core 320 and the lower movable core 322 in the pinching direction G are set so as to push and cut the metal plate 130 (reduce the thickness of the metal plate 130). Accordingly, the generation of burrs is suppressed as the resin material does not enter the space between the pinching portions 328 and the metal plate 130.

As shown in FIGS. 16 and 18, one end of the sheet member 134 in the lateral direction (the direction of the arrow y) is inserted into the cavity 302 while being arranged over the plural pinching portions 328 of the lower movable core 322 in the direction of the arrow z. The sheet member 134 is arranged such that each through hole 136 coincides with each groove 324 for a rib in the direction of the arrow z.

Hereinafter, the relationship between the curling of the sheet member 134 and the flow of the resin material poured from the inlet 312 will be described.

Figures 19A, 19B:
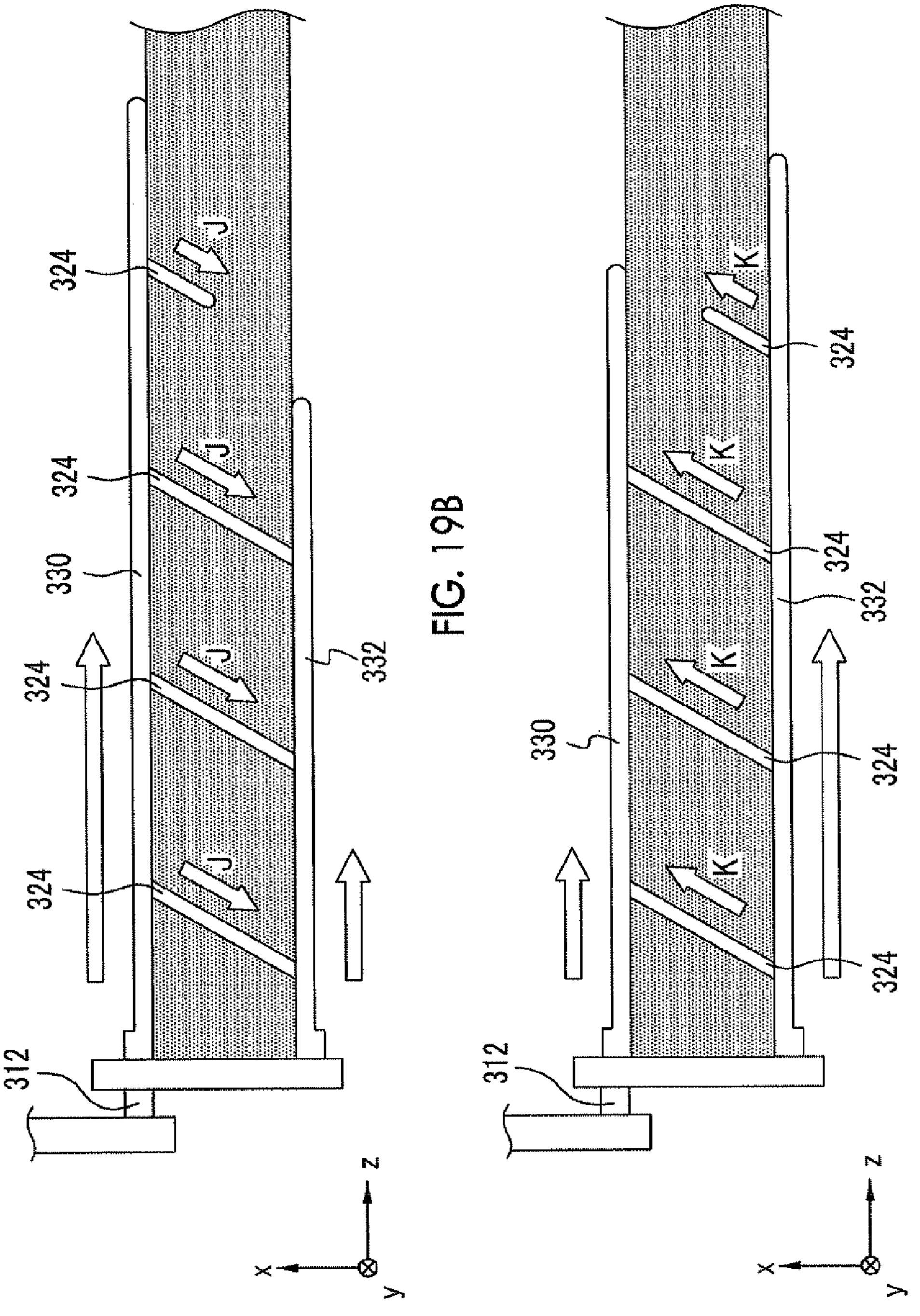
FIGS. 19A and 19B are explanatory views showing the flow of molten resin.
Figure 20A:
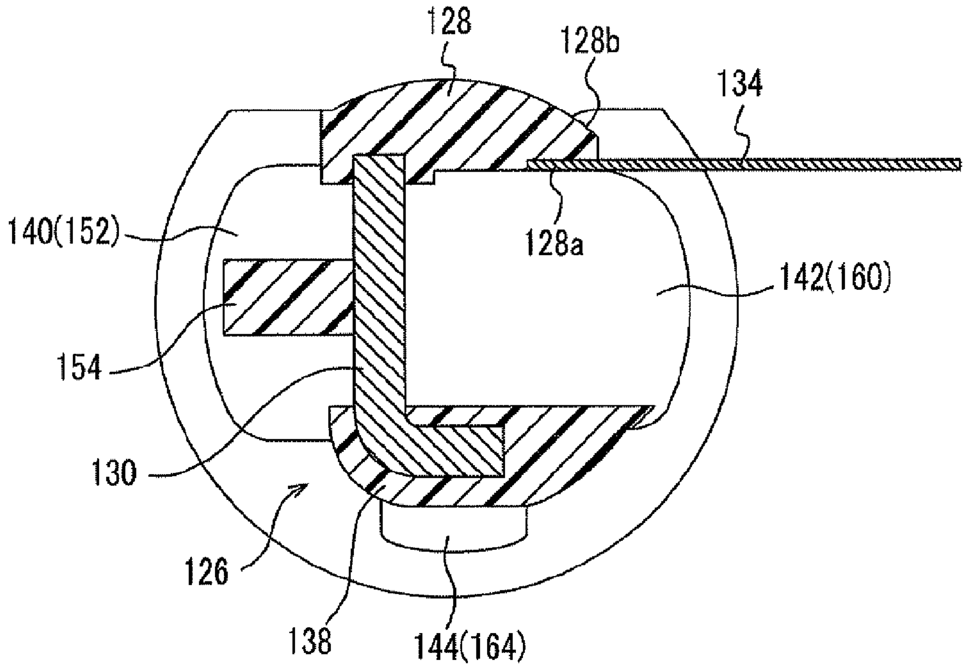
FIG. 20A is a cross-sectional view of the pressing member showing the state where the sheet member is integrated by insert molding.

As shown in FIG. 19A, if the flow of the resin material that flows through a pressing portion equivalent portion 330 within the cavity 302 is faster than the flow of the resin material that flows through a long portion equivalent portion 332, as indicated by an arrow J in FIGS. 16, 18, and 19A, the resin material passes through the grooves 324 for a rib toward the long portion equivalent portion 332 from the pressing portion equivalent portion 330 side. In this case, a force in a direction in which the sheet member is pressed against the plural pinching portions 328 is applied to the sheet member 134. As a result, as shown in FIG. 20A, in the insert-molded pressing member 124, the sheet member 134 is not curled toward the outer surface 128*b* of the pressing portion 128, and is held and integrated between the inner surface 128*a* of the pressing portion 128, and the second rib group 142.

Figure 20B:
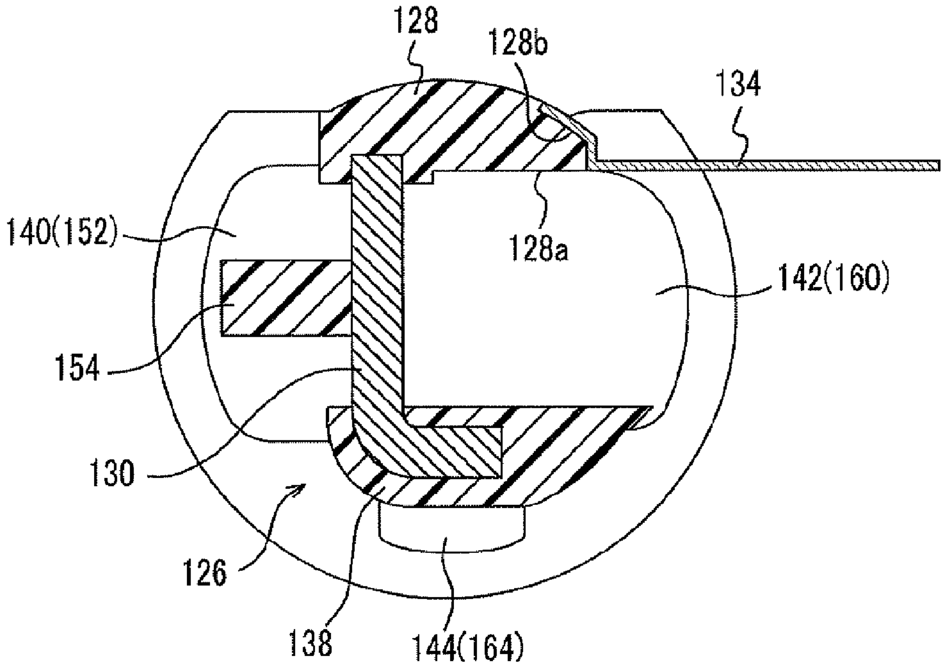
FIG. 20B is a cross-sectional view of a pressing member showing a state where the sheet member is not integrated toward the outer surface of the pressing portion by curling insert molding.

On the other hand, as shown in FIG. 19B, if the flow of the resin material that flows through a pressing portion equivalent portion 330 within the cavity 302 is slower than the flow of the resin material that flows through a long portion equivalent portion 332, as indicated by an arrow K in FIGS. 16, 18, and 19B, the resin material passes through the grooves 324 for a rib toward the pressing portion equivalent portion 330 side from the long portion equivalent portion 332. In this case, a force in a direction in which the sheet member is pulled away from against the plural pinching portions 328 is applied to the sheet member 134. As a result, as shown in FIG. 20B, in the insert-molded pressing member 124, the sheet member 134 is curled toward the outer surface 128*b* of the pressing portion 128, and is not integrated.

Here, the inlet 312 of the molding apparatus 300 of the present exemplary embodiment is provided in the fixed mold 306. That is, since the inlet 312 is provided on the side of the sheet member 134 opposite to the plural pinching portions 328, the direction in which the resin material poured from the inlet 312 passes through the grooves 324 for a rib becomes a direction indicated by the arrow J, and a force in the direction in which the sheet member is pressed against the plural pinching portions 328 is applied to the sheet member 134. Therefore, as shown in FIG. 20A, in the insert-molded pressing member 124, the sheet member 134 is not curled toward the outer surface 128*b* of the pressing portion 128, and is held and integrated between the inner surface 128*a* of the pressing portion 128, and the second rib group 142.

(Method for Manufacturing Insert Molded Article)

Next, a method for manufacturing the pressing member 124 that is an insert molded article will be described with reference to FIGS. 14 to 17, and FIG. 21.

Figure 21:
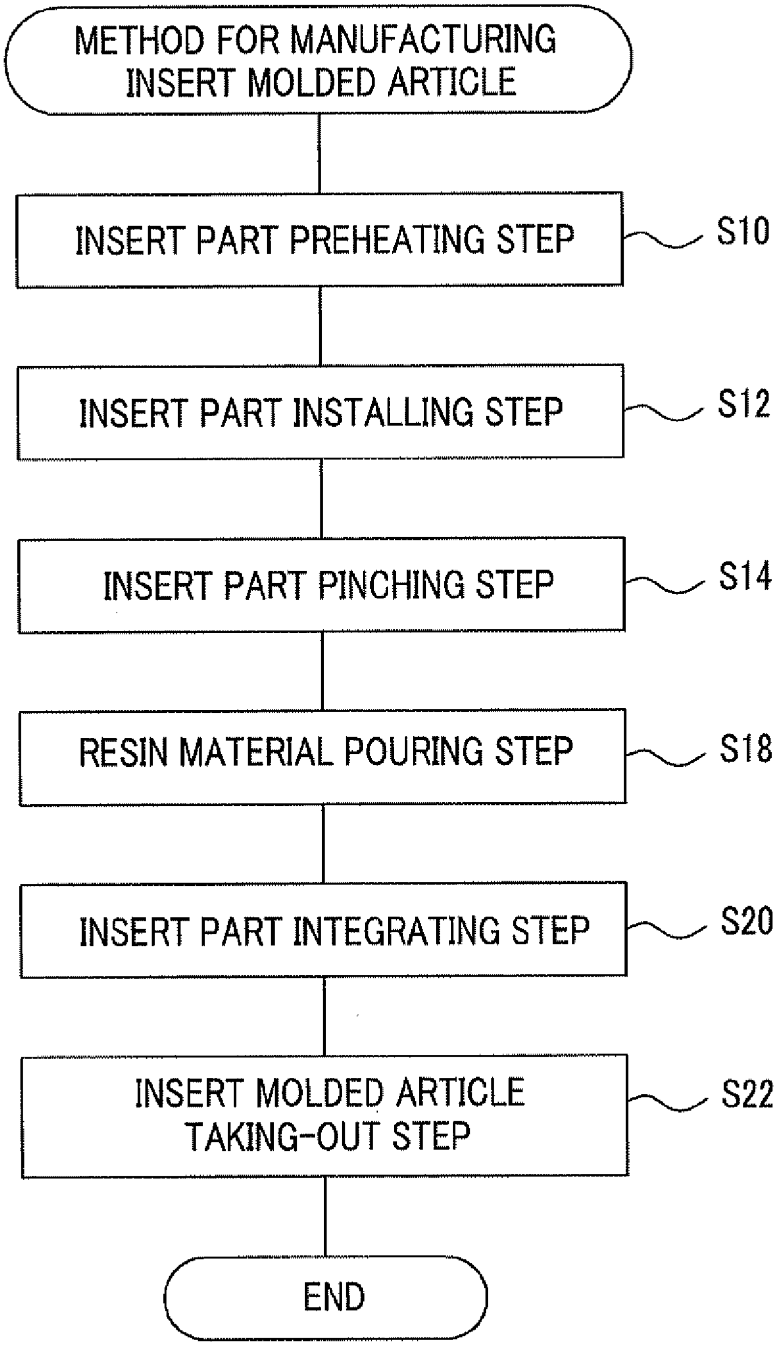
FIG. 21 is a flowchart showing a method for manufacturing the pressing member that is an insert molded article.

As shown in FIG. 21, first, in S10, the metal plate 130 that is one of insert parts is pre-heated (metal plate heating step). This pre-heating is performed by a heater (not shown) prepared separately from the molding apparatus 300 before the metal plate 130 is installed in the cavity 302. The metal plate 130 is pre-heated up to the same temperature (for example, 120° C.) as the mold 304. Here, the same temperature includes not only a case where the temperature of the metal plate 130 and the temperature of the mold 304 are equal, but also a case where the temperature of the metal plate 130 and the temperature of the mold 304 are substantially the same temperature and may be regarded as equal temperatures without a problem.

Next, the processing proceeds to S12 where the metal plate 130 and the sheet member 134 that are insert parts are installed in the mold 304. Specifically, as shown in FIGS. 14 and 15, the protruding portions 132 of the metal plate 130 are fitted into the positioning grooves 316 provided in the movable mold 308, and, the metal plate 130 is installed in the mold 304. Additionally, the sheet member 134 is suctioned and fixed to the wall surface of the fixed mold 306 such that one end of the sheet member 134 is inserted into the cavity 302, and the sheet member 134 is installed in the mold 304.

Subsequently, the processing proceeds to S14 where the metal plate 130 and the sheet member 134 that are insert parts are pinched by the mold 304 (pinching step). Specifically, as shown in FIGS. 15 and 16, the movable mold 308 is moved toward and clamped to the fixed mold 306, thereby pinching the metal plate 130 by the upper movable core 320 and the lower movable core 322, and pinching the sheet member between the lower movable core 322 and the fixed mold 306.

In this case, since the metal plate 130 is heated to the same temperature as the mold 304 in the metal plate heating step, the metal plate 130 has the same temperature as the mold 304 when the pinching step is completed. Although the reason why the metal plate 130 and the mold 304 are made to have the same temperature will be described below, the metal plate heating step may be after the pinching step as long as the metal plate 130 and the mold 304 may be made to have the same temperature. That is, first, in S12, the protruding portions 132 of the metal plate 130 that is an insert part is fitted into the positioning grooves 316 provided in the movable mold 308, and the sheet member 134 is suctioned and fixed to the wall surface of the fixed mold 306 such that one end of the sheet member 134 is inserted into the cavity 302. Thereafter, in Step S14, the metal plate 130 and the sheet member 134 that are insert parts are pinched by the mold 304 (pinching step). Then, since the temperature of the fixed mold 306 and the movable mold 308 is controlled to a given temperature, for example, 120° C. (predetermined temperature) by the heating device 310, the metal plate 130 is also heated to 120° C. via the upper movable core 320 and the lower movable core 322 that are the pinching member 318 by the heat conduction from the fixed mold 306 and the movable mold 308.

Next, the processing proceeds to S18 where molten resin (resin material) is poured (pouring step). Specifically, the molten resin injected from the injection machine (not shown) is poured into the cavity 302 from the inlet 312, and the cavity 302 is filled with the molten resin.

Next, the processing proceeds to S20 where the metal plate 130 and the sheet member 134 that are insert parts are integrated (integrating step). Specifically, the temperature of the fixed mold 306 and the movable mold 308 is controlled to a given temperature (for example, 120° C.) by the heating device 310, thereby cooling and solidifying the molten resin of, for example, 300° C. to 120° C., and integrating the metal plate 130 and the sheet member 134 as an insert molded article.

Next, the processing proceeds to S20 where the pressing member 124 that is an insert molded article is taken out from the cavity 302 (taking-out step). Specifically, as shown in FIG. 17, the movable mold 308 is moved and opened so as to be separated from the fixed mold 306, thereby making the upper movable core 320 and the lower movable core 322 movable in a non-pinching direction I, and taking out the pressing member 124 that is an insert molded article from the cavity 302.

As described above, since the molten resin is poured into the cavity 302 after the metal plate 130 is preheated or the metal plate 130 and the mold 304 are made to have the same temperature by the heat of the mold 304, when the molten resin is cooled and solidified, the cooling of the molten resin filled into the cavity 302 proceeds uniformly, and occurrence of cooling distortion between the resin material that contacts the metal plate 130 and the resin material that does not contact the metal plate 130 is suppressed. Therefore, the amount of deformation caused after the pressing member 124 is taken out from the cavity 302 is also suppressed, and the formation precision of the pressing member 124 is improved.

In addition, in the image forming apparatus 10 related to the present exemplary embodiment, the type that has the intermediate transfer belt 14 and performs primary transfer and secondary transfer has been described. However, the exemplary embodiment of the invention may also be applied to an image forming apparatus of the type that directly transfers a toner image held by the photoreceptor drum 16 to the recording paper P.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A molding apparatus for manufacturing an insert mold article having a circumferential surface in a longitudinal direction of the insert mold article, comprising:

a mold having a long cavity;

a pinching member that holds a long metal plate having a pair of longitudinal ends, a pair of lateral ends and a pair of surfaces forming a plate shape by pinching the long metal member, the long metal plate being inserted into the cavity such that the longitudinal direction of the long metal plate is directed to a longitudinal direction of the cavity and the long metal plate is positioned at a position offset from a center of the cross-section of the circumferential surface; and an inlet for pouring a resin material into a space defined between the mold and the pinching member, the space is prepared at least around both sides of the pair of surfaces of the long metal plate, wherein a shape of the space defined with the mold and the pinching member is such that the amounts of the resin material to be poured around the each side of the pair of surfaces of the long metal plate are equivalent.

2. The molding apparatus according to claim 1, wherein the pinching member has a plurality of pinching portions provided at an interval in the longitudinal direction of the cavity, wherein a sheet member having flexibility is arranged in the cavity over the plurality of pinching portions, and wherein the sheet member is positioned between the inlet and the plurality of pinching portions.

3. The molding apparatus according to claim 1, wherein the pinching member pinches the metal plate so as to reduce the thickness of the metal plate by the pinching.

4. The molding apparatus according to claim 2, wherein the pinching member pinches the metal plate so as to reduce the thickness of the metal plate by the pinching.

5. A method for manufacturing an insert molded article having a circumferential surface in a longitudinal direction of the insert mold article, comprising:

putting the metal plate into the cavity of the molding apparatus according to claim 1 and pinching the metal plate by the pinching member;

heating the metal plate such that the metal plate has the same temperature as the mold and the pinching member;

pouring the resin material from the inlet into a cavity into which the metal plate is put;

cooling the resin material and integrating the metal plate and the resin material as an insert molded article; and taking out the insert molded article from the cavity.

* * * * *